(12) United States Patent
Tutschek et al.

(10) Patent No.: US 8,899,899 B2
(45) Date of Patent: Dec. 2, 2014

(54) TOOL SHIELD RETAINER CLIP

(71) Applicant: Boundary Equipment Co. Ltd., Edmonton (CA)

(72) Inventors: Alex Tutschek, Edmonton (CA); Dave Wowk, Calgary (CA); Mihai Corabian, Edmonton (CA); Dragan Bogojevic, Edmonton (CA)

(73) Assignee: Boundary Equipment Co. Ltd., Edmonton (CA)

( * ) Notice: Subject to any disclaimer, the term of this patent is extended or adjusted under 35 U.S.C. 154(b) by 0 days.

(21) Appl. No.: 13/898,308

(22) Filed: May 20, 2013

(65) Prior Publication Data

US 2013/0248215 A1    Sep. 26, 2013

Related U.S. Application Data

(62) Division of application No. 13/052,801, filed on Mar. 21, 2011, now Pat. No. 8,443,911.

(60) Provisional application No. 61/317,188, filed on Mar. 24, 2010.

(51) Int. Cl.
| | | |
|---|---|---|
| *F16B 21/14* | (2006.01) |
| *E02F 9/28* | (2006.01) |
| *E02F 3/815* | (2006.01) |
| *A01B 31/00* | (2006.01) |

(52) U.S. Cl.
CPC .............. *E02F 9/2833* (2013.01); *E02F 3/8152* (2013.01); *A01B 31/00* (2013.01); *E02F 9/2841* (2013.01)
USPC ........................................ 411/523; 172/701.3

(58) Field of Classification Search
USPC ............ 411/523, 936; 248/27.3, 231.81, 314; 172/701.3, 193, 751; 24/293, 295, 24/573.09, 581.11
See application file for complete search history.

(56) References Cited

U.S. PATENT DOCUMENTS

| | | | |
|---|---|---|---|
| 507,509 A  * | 10/1893 | Taylor ........................... | 172/193 |
| 1,390,753 A | 9/1921 | Bergman | |
| 2,386,424 A | 10/1945 | Boots | |
| 2,431,639 A | 11/1947 | Goedken | |
| 2,634,664 A | 4/1953 | Benner | |

(Continued)

FOREIGN PATENT DOCUMENTS

| | | |
|---|---|---|
| CA | 940298 A1 | 1/1974 |
| WO | WO-00/04243 A1 | 1/2000 |

OTHER PUBLICATIONS

European Search Report dated Nov. 14, 2011, as received in corresponding European Patent Application No. 11 15 8998, 5 pages.

(Continued)

*Primary Examiner* — Árpád Fábián-Kovács
(74) *Attorney, Agent, or Firm* — Gilberto M. Villacorta; Karl F. Reichenberger; Foley & Lardner LLP

(57) ABSTRACT

A tool shield retainer clip for securing a removable tool to a tool carrier blade, and shielding the tool carrier blade is disclosed herein. The tool shield retainer clip includes a front section including an aperture for receiving a tool, a back section adjacent the front section, a tail flange connected to the back section opposite the front section, and a top section adjacent the front section and opposite the back section.

3 Claims, 22 Drawing Sheets

(56) References Cited

U.S. PATENT DOCUMENTS

| | | | |
|---|---|---|---|
| 3,152,411 A | | 10/1964 | Wood |
| 3,192,653 A | | 7/1965 | Socin |
| 3,215,873 A | * | 11/1965 | Kruger et al. ............... 310/68 R |
| 3,289,331 A | | 12/1966 | Freeman |
| 3,459,096 A | * | 8/1969 | Parkin ........................ 411/523 |
| 3,563,318 A | * | 2/1971 | Eberhardt et al. ............ 172/750 |
| 4,084,856 A | | 4/1978 | Emmerich et al. |
| 4,457,380 A | | 7/1984 | Curry |
| 4,489,986 A | | 12/1984 | Dziak |
| 4,501,079 A | | 2/1985 | Hahn et al. |
| 4,570,366 A | | 2/1986 | Yost |
| 4,753,299 A | | 6/1988 | Meyers |
| 5,007,484 A | * | 4/1991 | Johanson ........................ 172/1 |
| 5,011,101 A | * | 4/1991 | Buchser ...................... 248/27.3 |
| 5,224,555 A | | 7/1993 | Bain et al. |
| 5,396,963 A | | 3/1995 | Curry |
| 5,481,839 A | * | 1/1996 | Lang et al. ..................... 52/235 |
| 6,854,527 B2 | | 2/2005 | Manway et al. |
| 7,159,344 B2 | | 1/2007 | Karhi |
| 7,836,615 B2 | | 11/2010 | Winter |
| 7,874,085 B1 | | 1/2011 | Winter et al. |
| 8,191,287 B2 | | 6/2012 | Winter et al. |
| 8,209,887 B2 | | 7/2012 | Ghosh |
| 2002/0093824 A1 | * | 7/2002 | Bucher ........................ 362/396 |
| 2004/0216335 A1 | | 11/2004 | Jones |
| 2005/0132619 A1 | | 6/2005 | Robinson |
| 2006/0026870 A1 | | 2/2006 | Karhi |
| 2007/0245600 A1 | | 10/2007 | Hamel |
| 2008/0263907 A1 | | 10/2008 | Winter |
| 2011/0225854 A1 | | 9/2011 | Winter et al. |

OTHER PUBLICATIONS

Non-Final Office Action mailed Sep. 27, 2012, as received in corresponding U.S. Appl. No. 13/052,801, 7 pages.

Notice of Allowance mailed Jan. 25, 2013, as received in corresponding U.S. Appl. No. 13/052,801, 5 pages.

Partial European Search Report dated Aug. 2, 2011, as received in corresponding European Patent Application No. 11 15 8998, 4 pages.

* cited by examiner

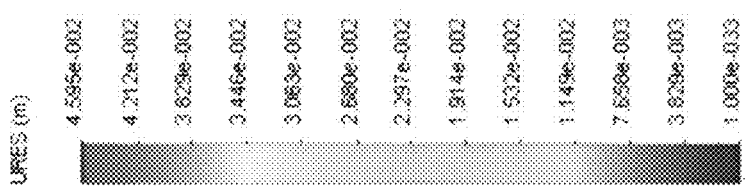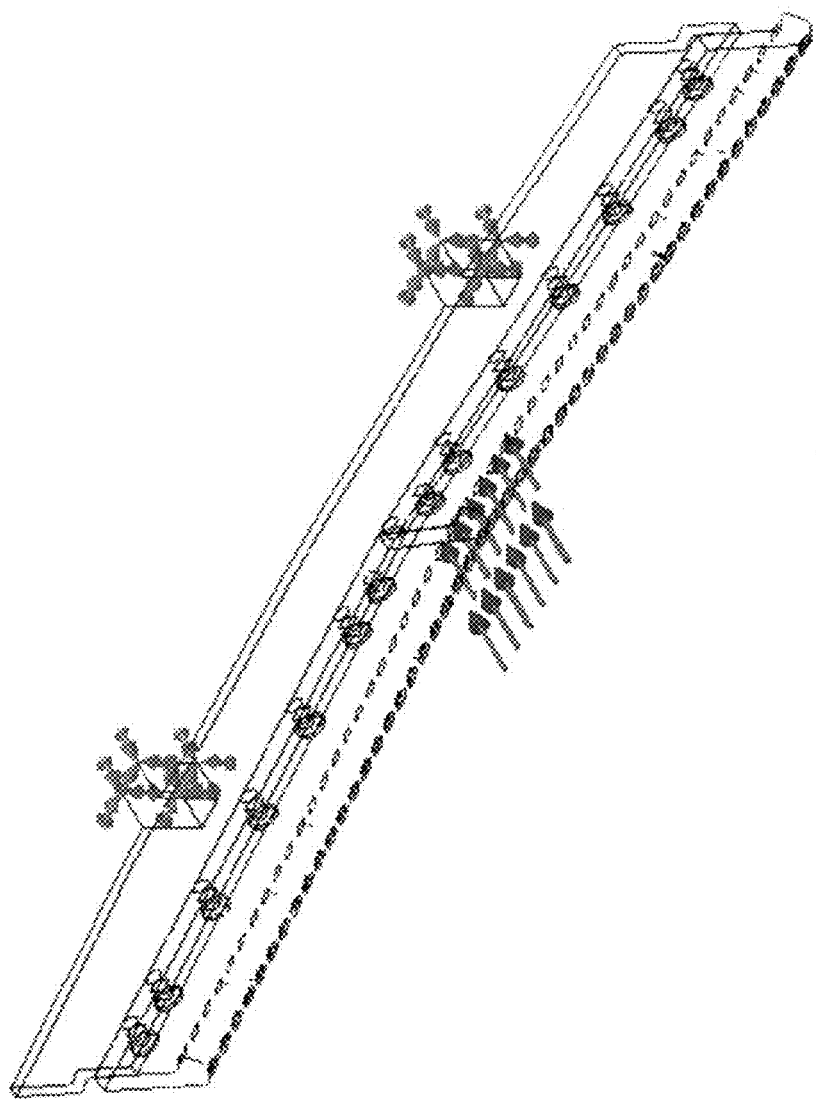
FIG. 20

TOOL SHIELD RETAINER CLIP

CROSS REFERENCE TO RELATED APPLICATIONS

The present application is a divisional application of U.S. application Ser. No. 13/052,801, filed on Mar. 21, 2011, which claims the benefit of U.S. Provisional Application No. 61/317,188, the entire disclosures of which are incorporated herein by reference.

FIELD OF INVENTION

The invention relates to blade assemblies for a surface working machine and more specifically to blade assemblies comprising overlapping blade segments and the overlapping blade segments themselves.

BACKGROUND

A surface working machine, such as a grader or plough, employs a large generally horizontal blade to work the surface as needed. The large blade is generally comprised of a moldboard having detachably mounted on the lower edge thereof a blade (shown for example in FIG. 1 or 2) which sustains the principle wear and abrasion. The blade may be any type of surface working blade including a cutting edge, serrated edge, etc, and is typically the result of the end to end connection of a plurality of blade segments. Eventually, the overall blade or one or more blade segments becomes worn and must be replaced. In case of local damage, the entire blade segment must be replaced.

One industry tendency has been to make the blade segments as long as possible to reinforce the thinner moldboard. The size and weight of the blade segments with installed tools has increased and is very difficult to manhandle. Changing a set of segments is a two-man operation.

The idea of shortening the individual blade segments that make up the blade has been explored and results in moldboard deterioration. The moldboard of the machine is thinner than the blade and blade segments. In previous attempts, when multiple shorter sections of the blade segments were used, it would reduce the strength of the assembly in the area where the shorter segments were butting together. This problem is stipulated, for example, in Canadian patent 940298.

It has also been observed, that even when longer segments are used in an effort to reduce the weakening of the overall blade, the local join region of the moldboard associated to the gap between adjacent segments, allowed for fine material particles to flow between the segments and washout or erode the moldboard.

Shortening the segments to allow for easier manhandling results in an increase in the number of joins and therefore an increase in the washout or erosion of the moldboard. Shortening the segments also causes problems in properly positioning an adequate number of fasteners onto the shorter segment while still using available connection holes on the moldboard.

In the current state of the art, significant amount of wear is observed at the front lower face of the blade. Presently, this area may be protected with wear strips welded on the front lower face of the blade. However, this solution adds additional weight and cost to the tool carrier blade. Also, replacement of the wear strip can only be done in a shop with adequate welding equipment.

An additional problem associated with the current state of the art blade assemblies relates to blade assemblies including a tool carrier blade wherein a plurality of tool bits are connected to the blade. Wear is observed under the tool flange and is not reduced through the use of a wear strip as outlined above. Further, in operation, when a portion of the blade is not in contact with the ground, it is commonly found that the strength of the tool spring clip is not sufficient to hold the tool in place. In a road maintenance operation, typically the end-section of the blade hangs over the edge of the road and tools that are suspended may be dislodged and fall off.

A need therefore exists to provide a blade segment and blade assembly therewith which overcomes or mitigates one of the deficiencies outlined above or that is observed in the industry. A need further exists to provide a tool retaining clip which overcomes or mitigates one of the deficiencies outlined above or that is observed in the industry.

SUMMARY OF THE INVENTION

A segmented blade comprised of overlapping blade segments is provided. Each blade segment overlaps with adjacent segments thereby providing for an overlapping joint between segments. The overlapping joint reduces erosion and/or washout of the underlying moldboard. Further, in one embodiment, the overlapping joint may include a connector hole such as a bolt hole through which a bolt detachably connects the overlapped sections of adjacent blade segments with the moldboard. Such a connection increases the strength of the connection as well as the strength of the moldboard in the region of the connection. This allows for smaller blade segments to be used and allows for segments which are of a suitable size to be manhandled by a single operator without jeopardizing the strength of the moldboard and/or the longevity of the moldboard.

In one illustrative embodiment there is provided a blade assembly for use on a surface working machine, the blade assembly comprising:
  a moldboard comprising a lower mounting section including a mounting edge for mounting a plurality of blade sections thereto; and
  a plurality of blade segments for detachable connection to the lower mounting section of the moldboard and adapted to overlap with any adjacent blade segment when mounted to the moldboard, each blade segment comprising:
    a front face for forward machine orientation;
    a back face opposite the front face;
    a right edge including a first overlap section;
    a left edge including a second overlap section;
    said first overlap section shaped for overlap with said second overlap section of an adjacent blade segment so that when mounted to the moldboard adjacent blade segments substantially abut each other.

In a further embodiment of the blade assembly, the first overlap section is comprised of a recessed section and an extension section wherein the extension section extends beyond the edge of the segment and the recessed section is adapted to accommodate an adjacent extension section of an adjacent blade segment.

In a further embodiment of the blade assembly, the blade segment has a thickness T defined by the distance between the front face and the back face, the first overlap section has a thickness ½T and the second overlap section has a thickness ½T so that when mounted, the first and second overlap section have a combined thickness of about T.

In a further embodiment of the blade assembly, one of the first overlap section or the second overlap section is substantially flush with the front face and the other of the first overlap section or the second overlap section is substantially flush with the back face.

In a further embodiment of the blade assembly, the first overlap section comprises a first bolt hole aperture, the second overlap section comprising a second bolt hole aperture, the first and second bolt hole apertures for receiving a connector bolt, the first and second bolt hole apertures situated to align with a bolt hole aperture from an adjacent blade segment, and wherein the lower mounting section of the moldboard comprises a series of bolt hole apertures aligned to correspond with the first and second bolt holt apertures of the overlapping blade segments for mounting of the overlapping blade segments.

In a further embodiment of the blade assembly, the front face further comprises a plurality of deflector strips protruding from the front face, the plurality of deflector strips for increasing structural rigidity of the segment.

In a further embodiment of the blade assembly, each blade segment is a blade segment selected from a scraper blade, a flat scraper blade, a serrated blade, and a tool carrier blade.

In a further embodiment of the blade assembly, each blade segment is a tool carrier blade and further comprises a series of tool receiving holes, each hole for receiving a tool bit.

In a further embodiment of the blade assembly, the deflector strips are oriented to direct material flow from a face of the moldboard.

In a further illustrative embodiment, there is provided a blade segment adapted for overlapping with adjacent blades segments of a blade assembly, the overlapping blade segment comprising:
- a front face for forward machine orientation;
- a back face opposite the front face;
- a right edge including a first overlap section;
- a left edge including a second overlap section;
- said first overlap section shaped for overlap with said second overlap section of an adjacent blade segment so that when mounted to a moldboard adjacent blade segments substantially abut each other.

In a further embodiment of the blade segment, the first overlap section is comprised of a recessed section and an extension section wherein the extension section extends beyond the edge of the segment and the recessed section is adapted to accommodate an adjacent extension section of an adjacent blade segment.

In a further embodiment of the blade segment, the blade segment has a thickness T defined by the distance between the front face and the back face, the first overlap section has a thickness ½T and the second overlap section has a thickness ½T so that when mounted, the first and second overlap section have a combined thickness of about T.

In a further embodiment of the blade segment, one of the first overlap section or the second overlap section is substantially flush with the front face and the other of the first overlap section or the second overlap section is substantially flush with the back face.

In a further embodiment of the blade segment, the first overlap section comprises a first bolt hole aperture, the second overlap section comprising a second bolt hole aperture, the first and second bolt hole apertures for receiving a connector bolt and the first and second bolt hole apertures are situated to align with a bolt hole aperture from an adjacent blade segment.

In a further embodiment of the blade segment, the front face further comprises a plurality of deflector strips protruding from the front face, the plurality of deflector strips for increasing structural rigidity of the segment.

In a further embodiment of the blade segment, the blade segment is a blade segment selected from a scraper blade, a flat scraper blade, a serrated blade, and a tool carrier blade.

In a further embodiment of the blade segment, the blade segment is a tool carrier blade and further comprises a series of tool receiving holes, each hole for receiving a tool bit.

In a further embodiment of the blade segment, the deflector strips are oriented to direct material flow from a face of the moldboard.

In a further embodiment of the blade segment, the back face comprises a longitudinal ridge for engagement with a tool retainer clip.

In a further illustrative embodiment, there is provided a tool shield retainer clip for at least partially securing a removable tool to a tool carrier blade and shielding a tool carrier blade, the tool carrier blade comprising a back face and a bottom edge, the back face including a longitudinal ridge and the bottom edge including a tool receiving hole for accommodated a removable tool, the tool shield retainer clip comprising:
- a front section including an aperture for receiving the connection end of the tool;
- a back section adjacent the front section, the back section and the front section connected at an angle substantially equal to the angle between the bottom edge and the back face of the blade, the back section having a length substantially equal to the distance between the longitudinal ridge and the bottom edge; and
- a tail flange connected to the back section opposite the front section, the tail flange shaped to engage the longitudinal ridge when the tool is fully inserted into the tool receiving hole.

In a further embodiment of the tool shield retainer clip, the clip further comprises:
- a top section adjacent the front section and opposite the back section, the top section connected to the front section at an angle suitable to provide the top section in an orientation substantial parallel to a front face of the blade.

In a further embodiment of the tool shield retainer clip, the aperture is centrally positioned in the front section and has a diameter adequate to compress the tools spring clip retainer to the diameter of the tool receiving hole in the bottom edge of the blade.

BRIEF DESCRIPTION OF THE DRAWINGS

FIG. 20 is a 3D graph representative of modelling of displacement of a non-overlapping prior art blade assembly having butt-joint segments;

DETAILED DESCRIPTION

Segmented Blade

A segmented blade for use with a blade assembly is provided, the segmented blade comprising a plurality of segmented blades, each blade adapted to overlap with an adjacent blade segment. The overlapping blade segments each comprise of an overlap section for overlapping interface with a corresponding overlap section from an adjacent blade segment. By providing the overlapping join between adjacent blade segments, the join reduces or altogether eliminates the gap between adjacent blade segments and thereby reduces the rate of erosion or washout of the moldboard in the region of the moldboard associated with the join between adjacent blade segments. In addition, each blade segment may be reduced in size to be manageable for a single operator. A segmented blade comprising overlapping blade segments is comprised of left and right end blade segments and one or more interior blade segment, each blade segment overlapping at the join with adjacent blade segments.

Figure 1:
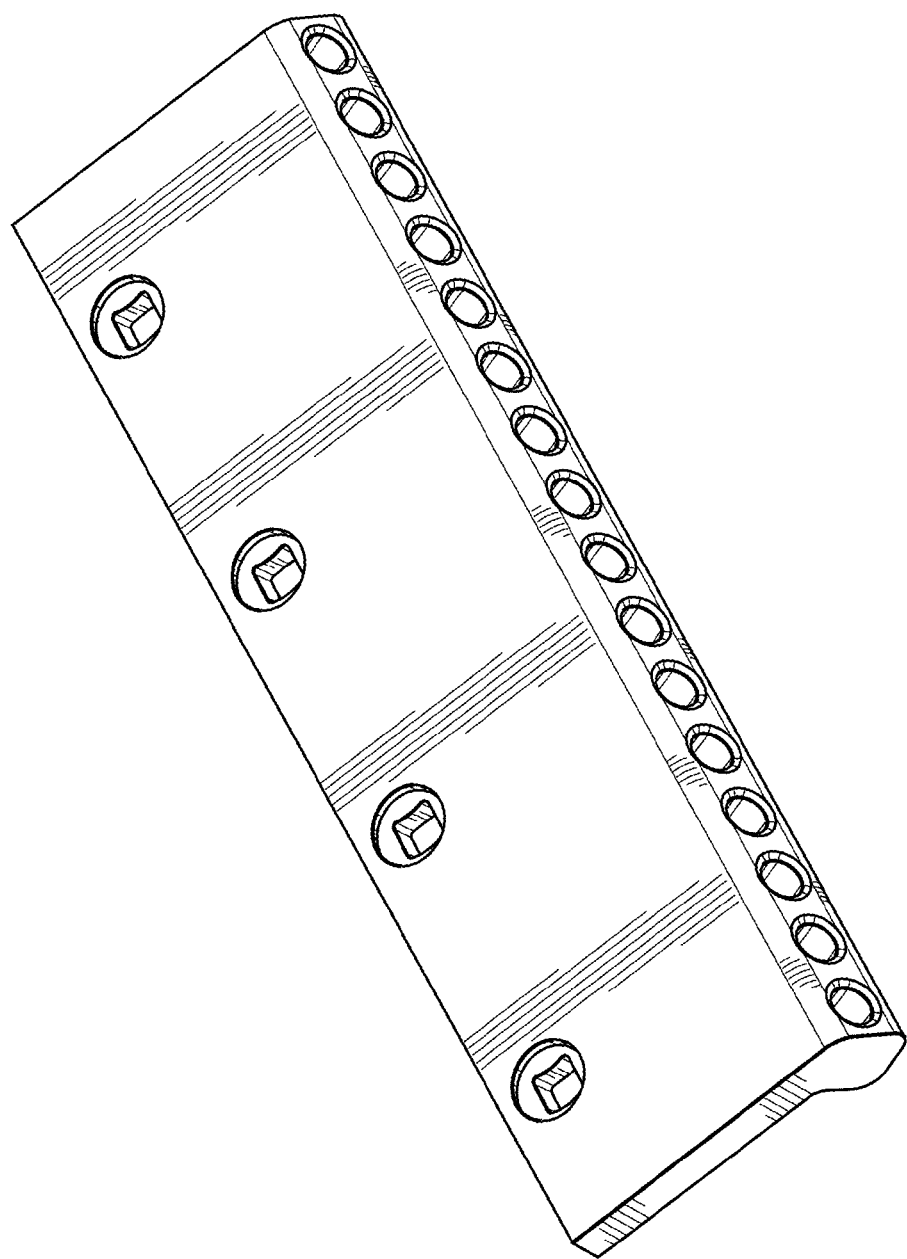
FIG. 1 is a prospective view illustrating a prior art blade.
Figure 2:
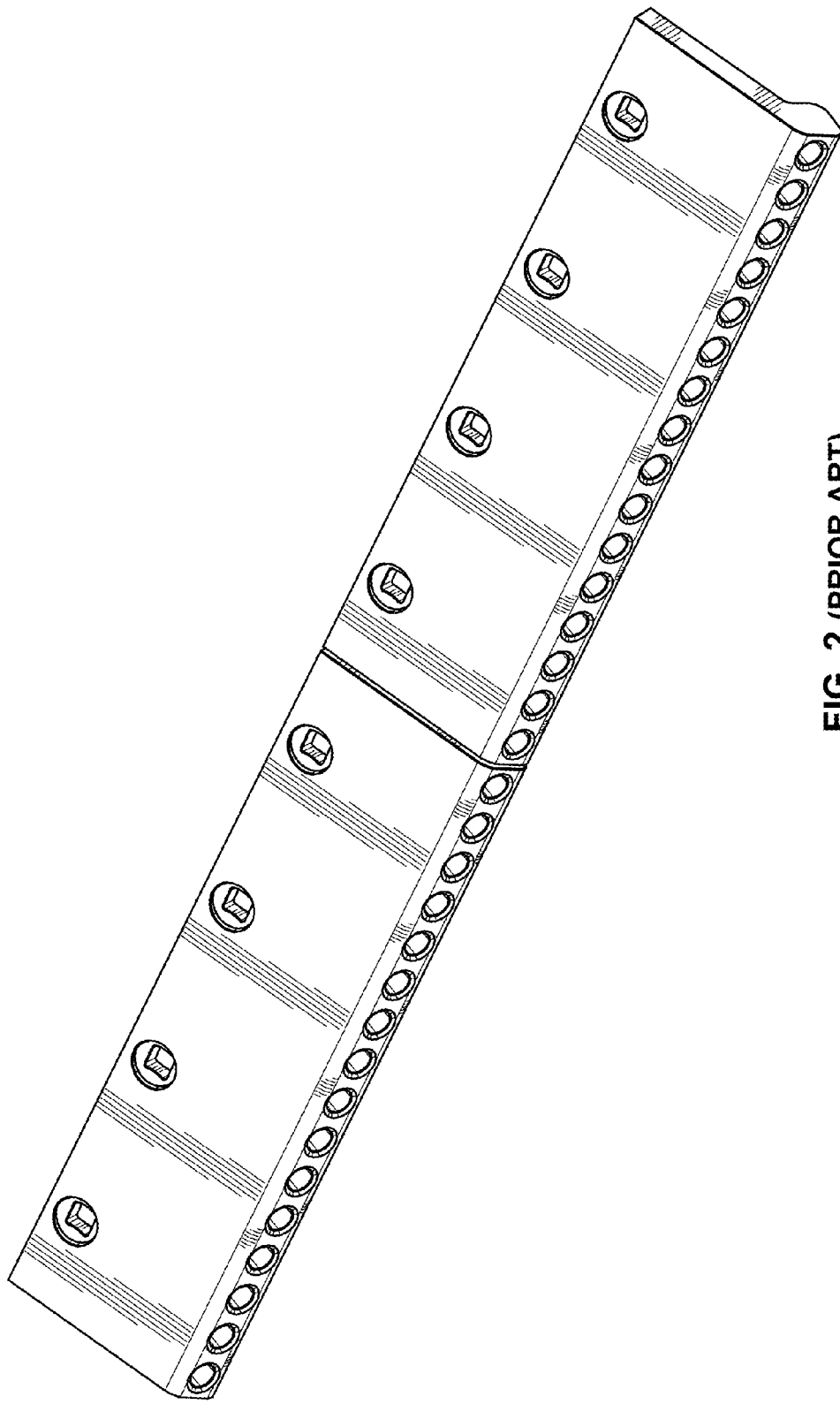
FIG. 2 is a prospective view illustrating the connection between adjacent prior art blades.
Figure 3:
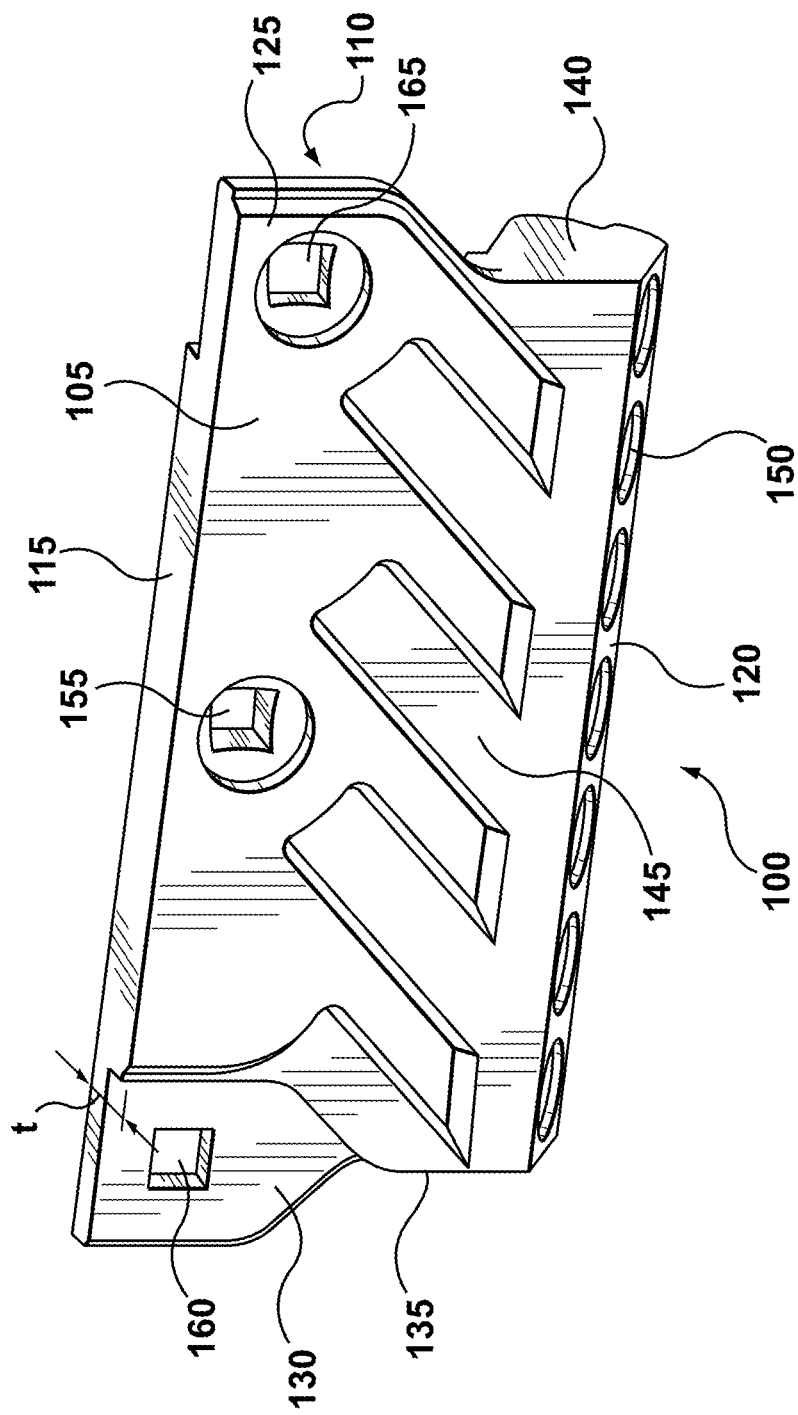
FIG. 3 is a schematic front side view illustrating an embodiment of a blade segment adapted to overlap with adjacent blade segments.
Figure 6A:
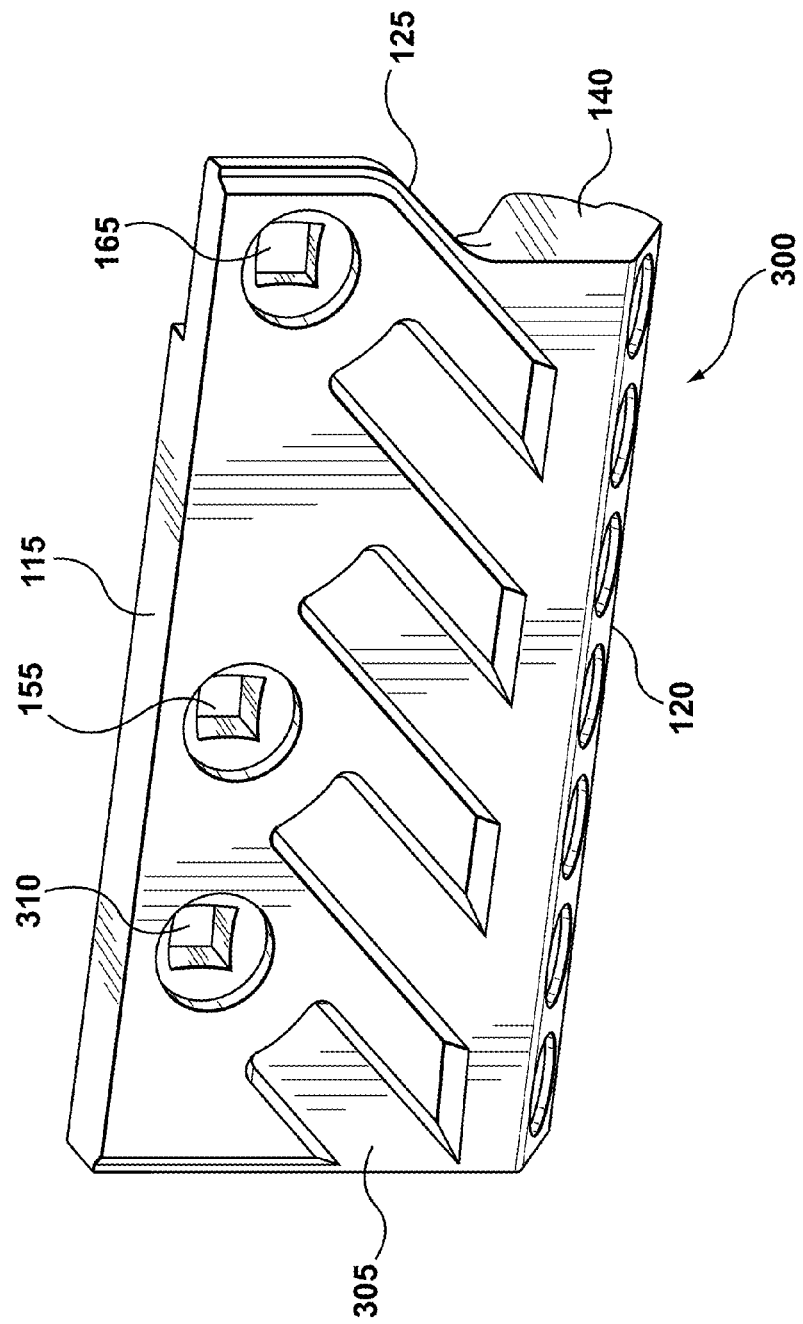
FIG. 6A is a prospective view illustrating an embodiment of a left end blade segment.

An example illustrative of an interior blade segment suitable for overlapping with adjacent blade segments is shown generally in FIG. 3 at 100. A left or right end blade segment may include many of the same elements as an interior segment and examples of a left and right end blade segment are shown in FIGS. 6A and 6C, respectively. The interior blade segment 100 is defined by a top side 115, a bottom side 120 opposite the top side, a left edge 135 and a right edge 140 opposite the left edge. The blade segment 100 further includes a front face 105 for forward orientation on the surface working machine and a back face 110 opposite the front face 105. In the illustrated embodiment of FIG. 3, the right edge 140 of the interior blade segment 100 abuts a left edge of an adjacent blade segment when connected to a moldboard of a blade assembly. Likewise, the left edge 135 of the interior blade segment 100 abuts a right edge of an adjacent blade segment when connected to a moldboard.

Extending past the right edge 140 is a first overlap section 125. Extending past the left edge 135 is a second overlap section 130. Each overlap section may be defined by an extension section which includes the region that extends beyond the left or right edge and a recessed section which includes a recessed region interior of the left or right edge. One of either the first or second overlap section 125 or 130 is flush with the back face 110 while the other of the first or second overlap section 125 or 130 is flush with the front face 105 of the blade segment 100. The recessed section of an overlap section is shaped to receive and accommodate the extension section of an adjacent blade segment. To better accommodate an adjacent extension section, the recessed section may have a fillet edge while the extension section may have a chamfered edged thereby ensuring proper fit of the overlapping sections.

The blade segment 100 has a thickness T defined as the distance between the black face 110 and the front face 105. Each overlap section may have a thickness of ½T such then when mounted, the first overlap section and the second overlap section of an adjacent blade segment have a total thickness of about T. Although FIG. 3 illustrates the overlap section as being along only about half the length of the edge of the blade segment, it will be appreciated that the overlap section may be along only a portion of the edge or alternatively along the entire length of the left or right edge. Further, the extension section and recessed section are shown as having a smooth surface against which each are overlapped with an adjacent section of the other, however, it will be appreciated that these surfaces may include a textured or interlocking grooves, ridges or other elements.

Figure 5:
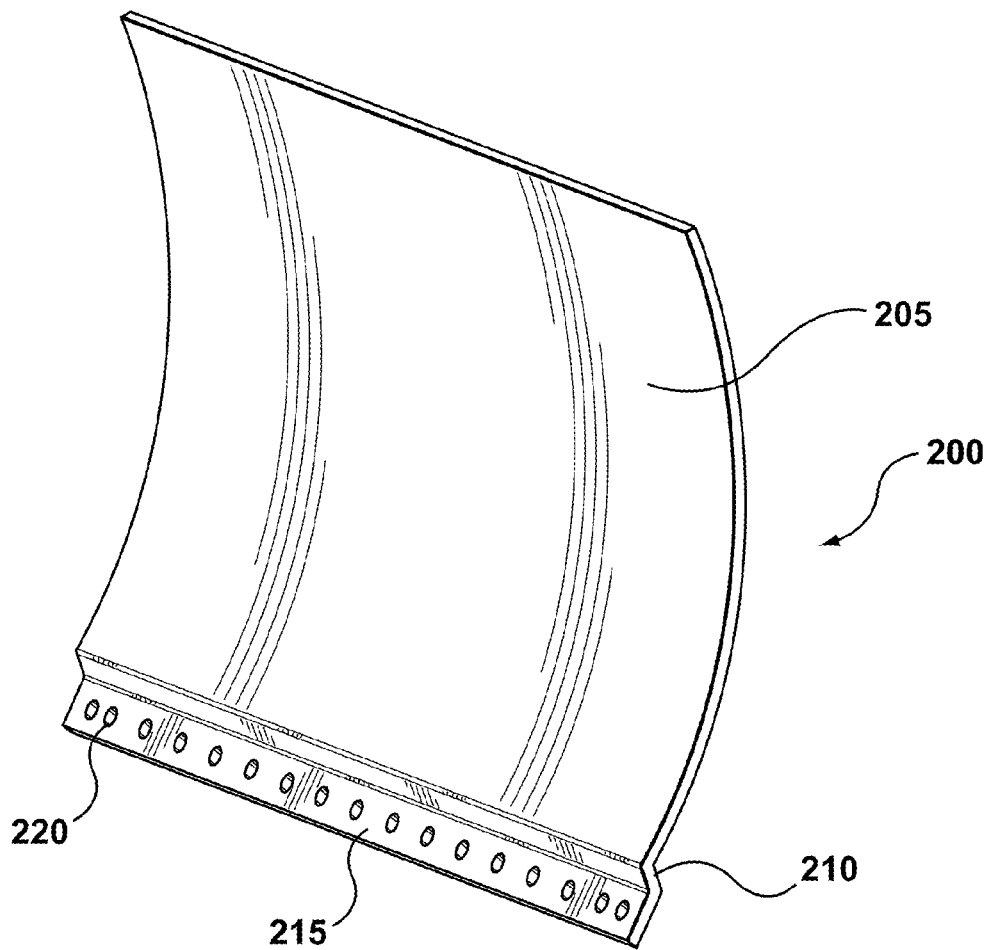
FIG. 5 is prospective view illustrating an embodiment of a moldboard.

Each blade segment 100 comprises one or more bolt holes positioned towards the top 115 of the blade segment 100 for receiving a bolt for detachably connecting the blade segment 100 to the a mounting edge of a moldboard (shown in FIG. 5). The bolt holes may be positioned to align with existing bolt holes in the moldboard. Additionally, the number of bolt holes from all of the blade segments of the blade assembly may correspond with the total number of bolt holes in the moldboard such that all connection points may be used. In one embodiment, a central bolt hole 155 may be positioned substantially in the top center region of the blade segment 100.

In addition, a bolt hole, such as a right bolt hole 165 and a left bolt hole 160 may be positioned in each overlap section 125 and 130, respectively. The right bolt hole 165 and the left bolt hole 160 should be situated such that when mounted, the right bolt hole 165 of a blade segment 100 aligns with the left bolt hole of an adjacent blade segment thereby allowing a bolt to connect the overlapping sections of adjacent blade segments with the moldboard and providing for a more secure connection and strengthening the joint between adjacent blade segments and minimizing weakness of the moldboard typically observed in the joining region of the moldboard associated with joint between adjacent segments. If necessary, additional bolt holes maybe added adjacent to the central bolt hole 155.

Each bolt holt 155, 160 and 165 may be adapted to receive a round or square style of bolt as desired. Further, the bolt hole 155, 160 or 165 may include a countersink to allow for the bolt head or to accommodate a nut as required.

The blade segment 100 may further include deflector strips 145 positioned on the front face 105. The deflector strips protrude out from the front face and are not included in the calculation of the thickness T of the blade segment 100. The deflector strips serve to increase the strength of the overlap joint. The deflector strips may be angled to diagonally extend across adjacent segments. The deflector strips 145 add thickness to the segment and strength to both the individual segment 100 and also to the overall segmented blade. Further, the deflector strips 145 may be oriented to deflect a portion of material flow away from the face of the moldboard thereby reducing wear on the moldboard.

As will be appreciated by one of skill in the art, the blade segment 100 illustrated in FIG. 3 is a tool carrier blade segment and therefore comprises a series of tool attachment holes 150 in the bottom 120 of the segment 100 for accommodating detachable connection of various tools used in the surface working industry. These tools include tools having a round shank for mounting including self rotating tools, as well as non-rotating type tools such as a chisel non-rotating tool.

Figure 4:
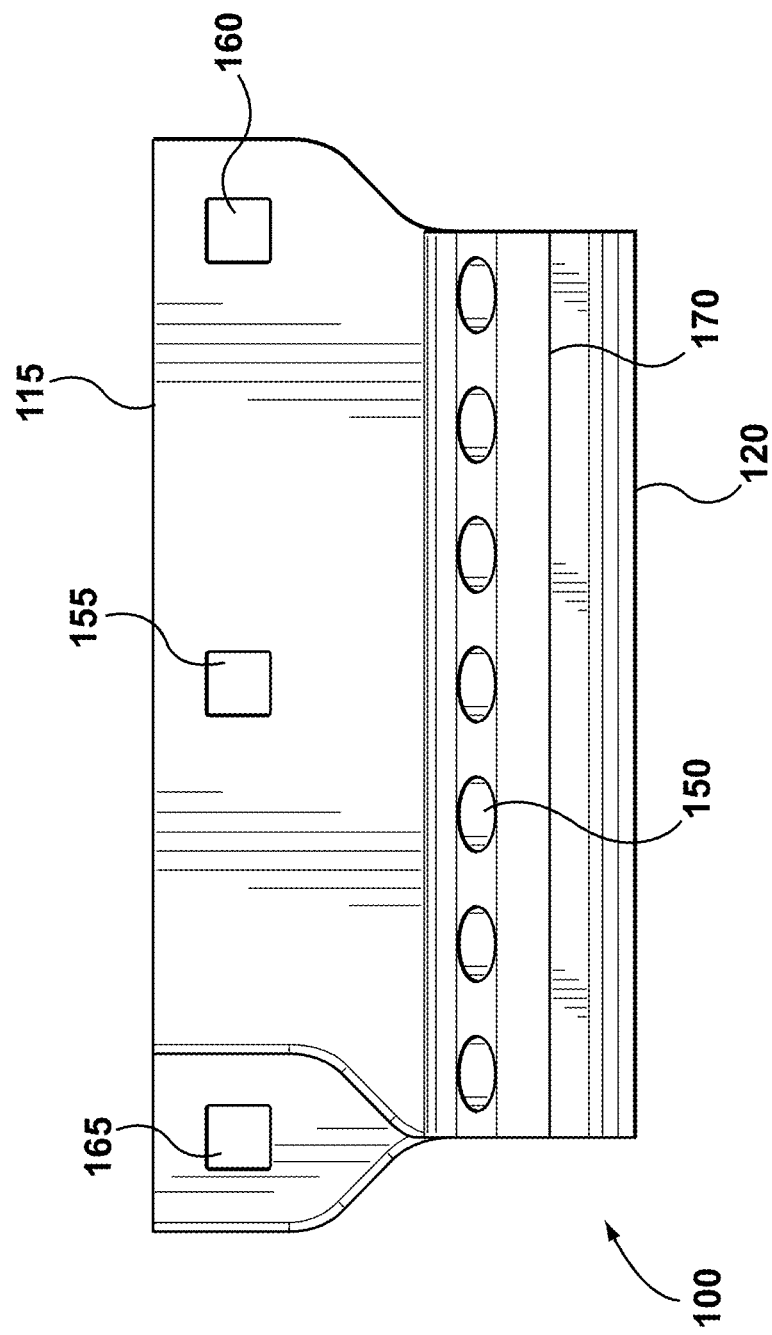
FIG. 4 is a schematic back side view illustrating an embodiment of a blade segment adapted to overlap with adjacent blade segments.
Figure 15:
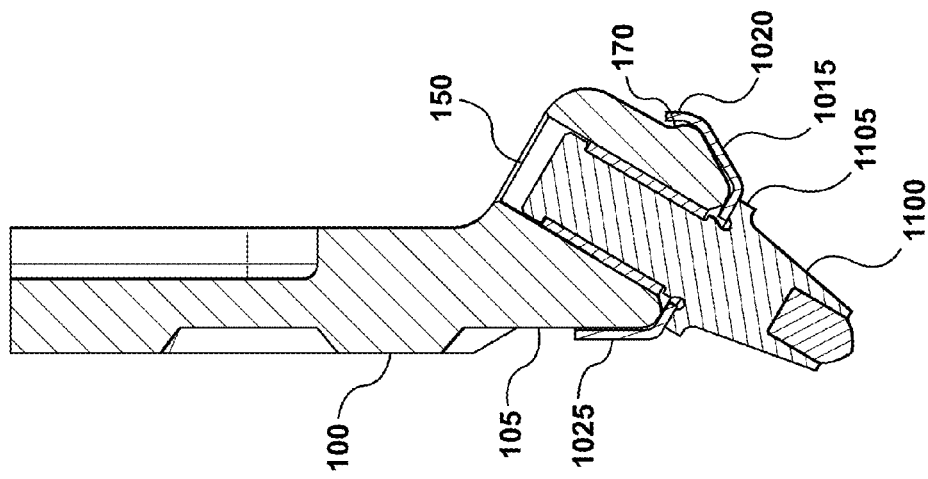
FIG. 15 is a side cross-sectional view illustrating one embodiment of a tool shield retainer clip and a rotating bit tool installed on a blade segment.
Figure 14:
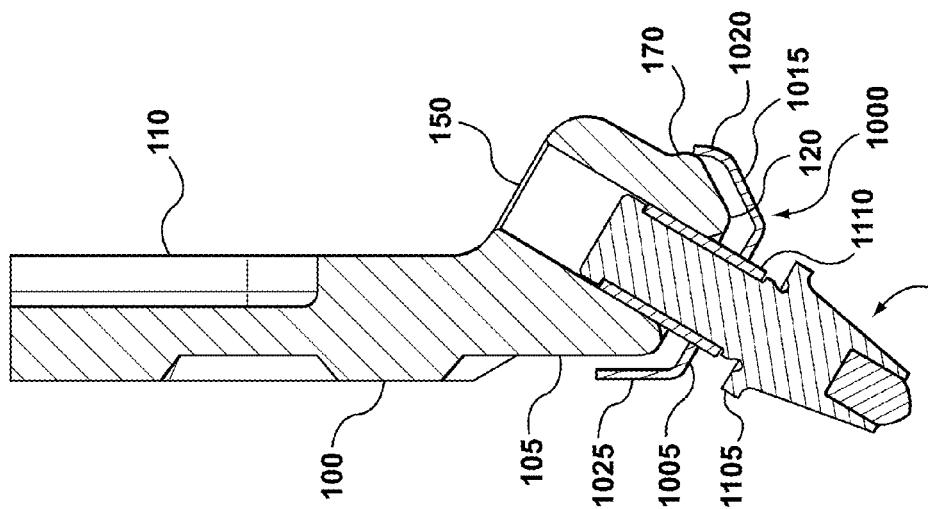
FIG. 14 is a side cross-sectional view illustrating one embodiment of a tool shield retainer clip and a rotating bit tool partially installed on a toll carrier blade segment.

An embodiment illustrating the back face 110 of the blade segment 100 is shown in FIG. 4. The back face 110 includes apertures associates with the tool attachment holes 150 which penetrate though the blade segment 100 at a suitable angle. Also shown are the bolt holes 155, 160 and 165 which penetrate through the thickness of the blade segment 100 allowing for mounting of the blade segment 100 to a moldboard. The back face 110 of the blade segment 100 includes a longitudinal ridge 170 which extends the length of the segment 100 and has sufficient depth to engage a tool shield retainer clip (shown in FIGS. 14 and 15).

Shown in FIG. 5 is a typical moldboard 200 for use as a component of a blade assembly for attachment to a surface working vehicle. The bottom edge of the moldboard 200 includes a lower mounting section 210 generally defined by a rearward step and a lower mounting edge 215. The lower mounting edge 215 includes a series of mounting holes 220 through which bolts or the like may be used to detachably connect the overlapping blade segments such as those outlined in FIGS. 3 and 4. The front face 205 of the moldboard is oriented in the forward direction of the surface working machine. It will be appreciated that the overlapping blade segments described herein may be used with moldboards known in the art.

Figure 6B:
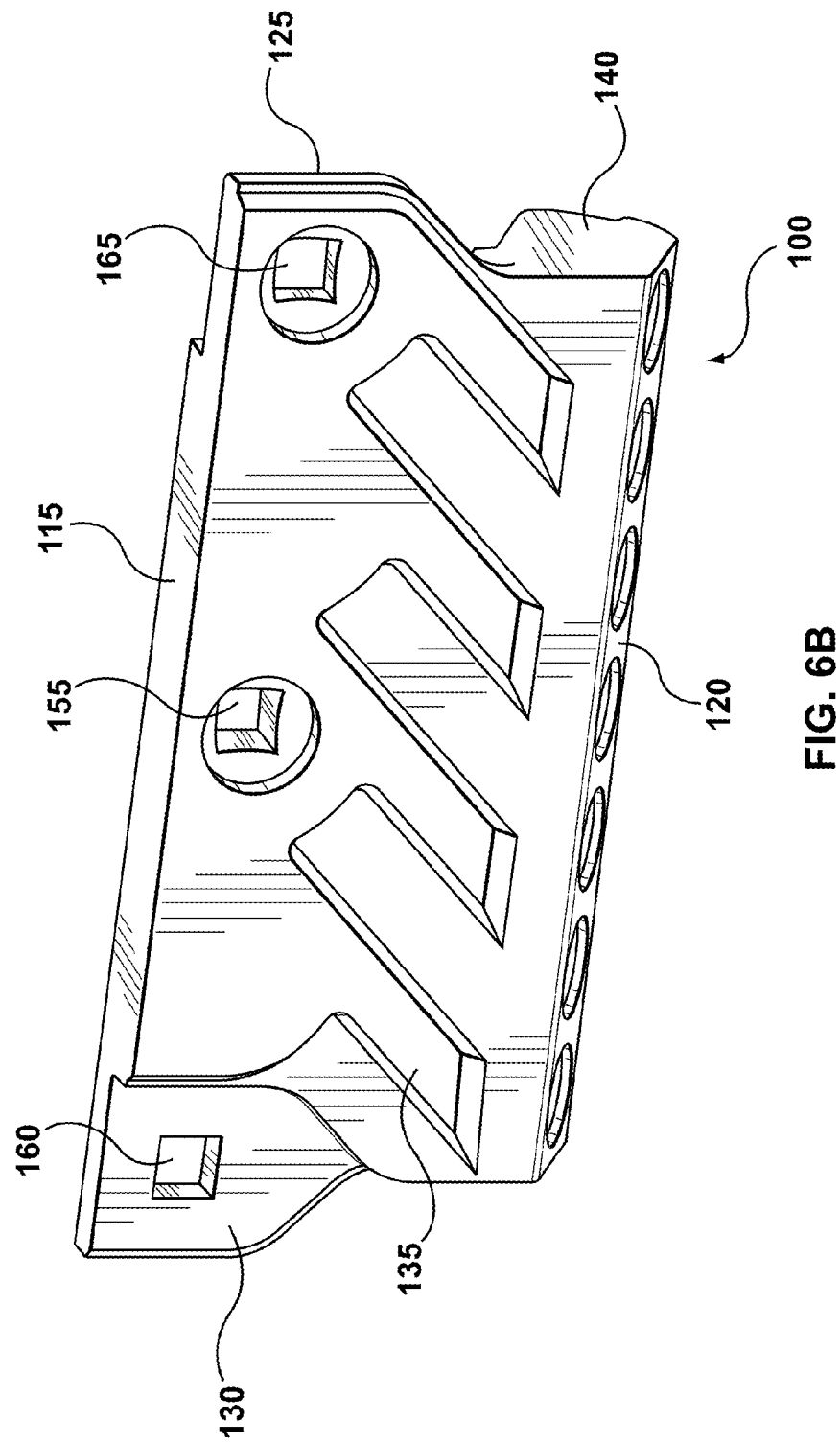
FIG. 6B is a prospective view illustrating an embodiment of a central blade segment.
Figure 6C:
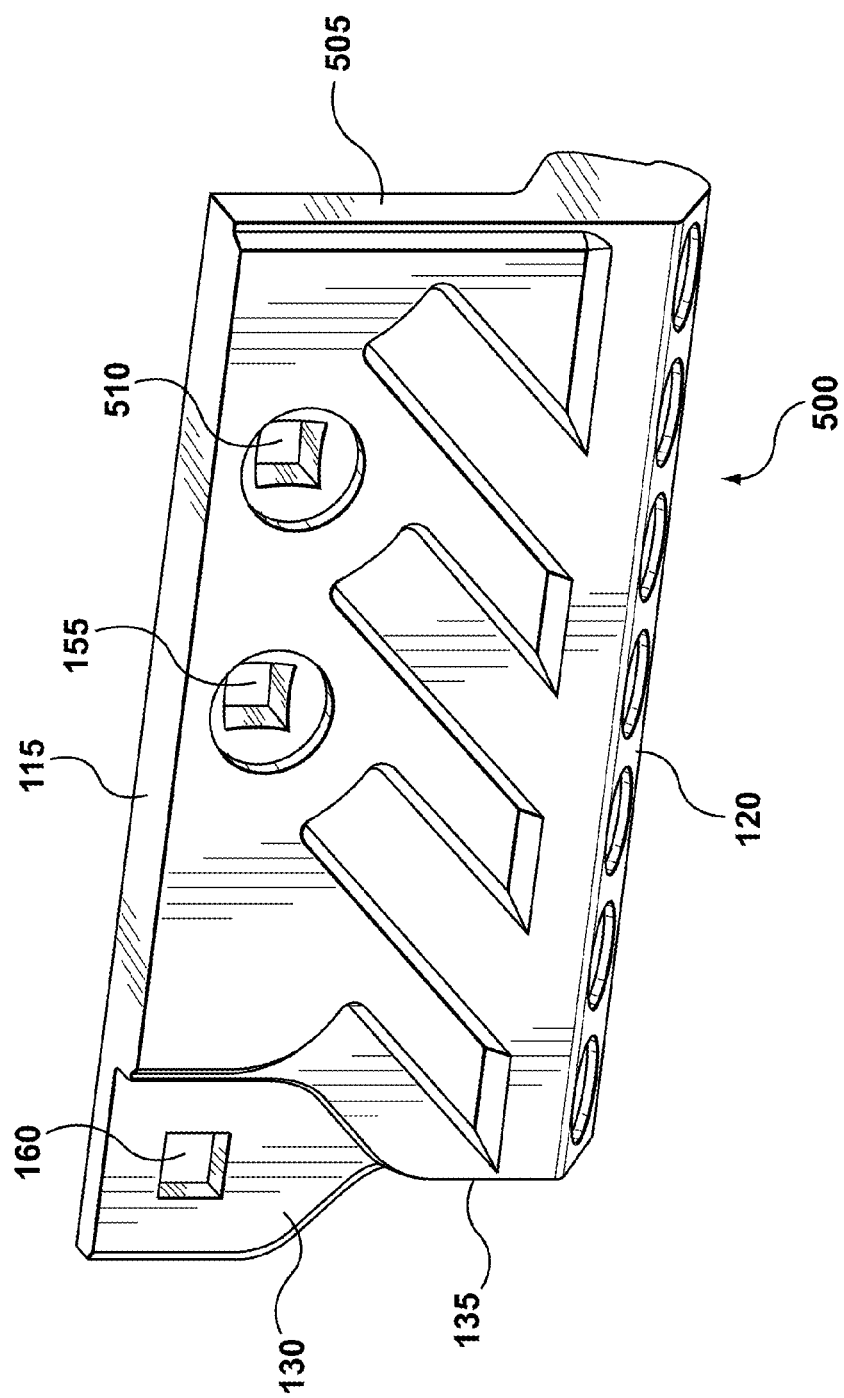
FIG. 6C is a prospective view illustrating an embodiment of a right end blade segment.
Figure 7:
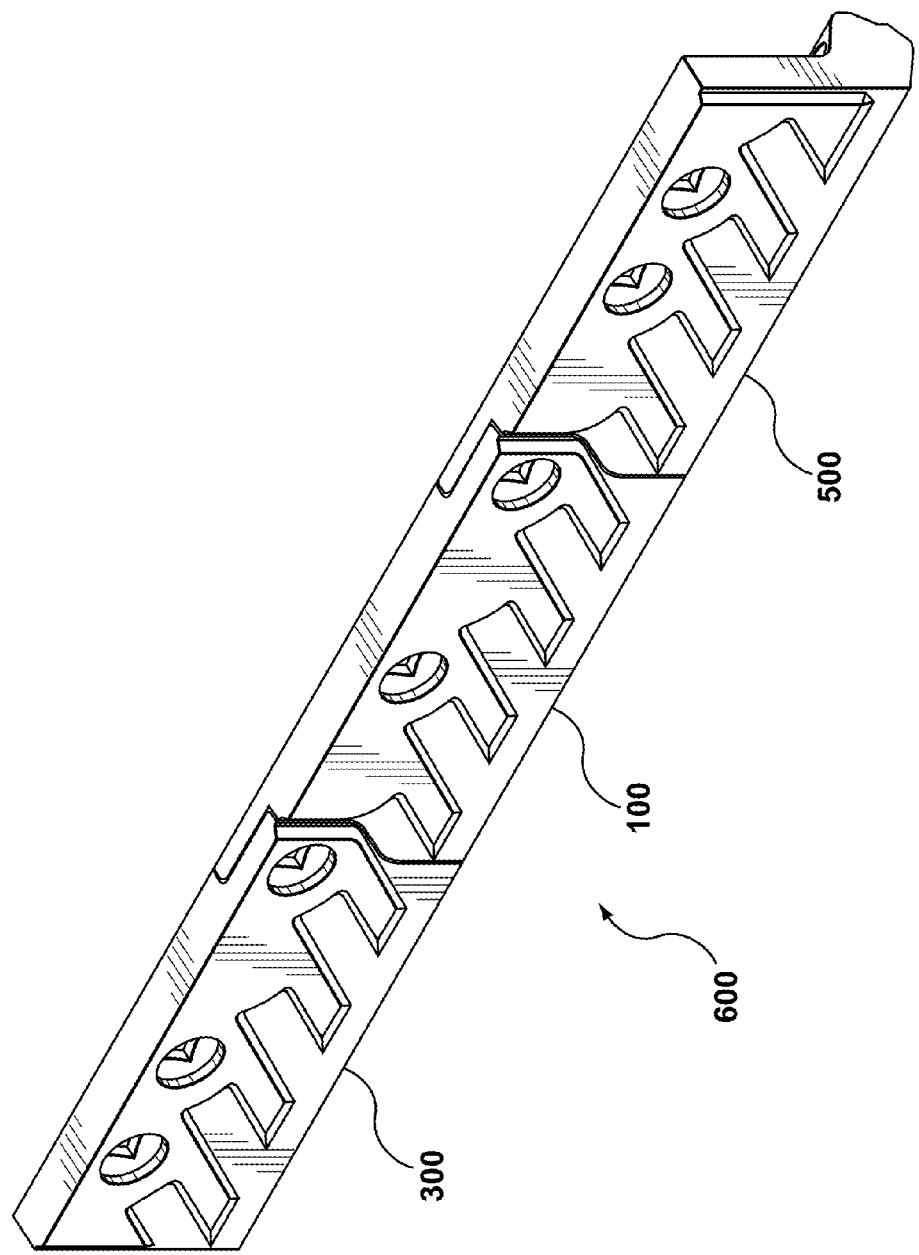
FIG. 7 is a prospective view illustrating an embodiment of the left end, central and right end overlapping blade segments illustrating the overlapping join of adjacent segments.

FIGS. 6A, 6B and 6C show illustrative examples of a left end blade segment 300, an interior blade segment 100 and a right end blade segment 500, respectively. As outlined above, a segmented blade, such as that shown generally in FIG. 7 as 600, may be comprised of a left end blade segment 300 situated as the left most segment of the segmented blade, a right end segment 500 situated as the right most segment of the segmented blade, and the remainder of the interior length of the segmented blade is achieved with one or more interior blade segments 100. The left end segment 300, being for use as the left most segment of the segmented blade, does not therefore have a blade segment situated adjacent to the left and therefore does not require an overlap element on the left side. Similarly, the right end segment 500 does not have an adjacent blade segment situated to the right and therefore does not require an overlap element on the right side.

The left end blade segment 300 may include a left edge 305 that does not include an overlap section, a recessed section or an extension section as no blade segment is placed to the left of the left end segment 300. The left edge 305 may therefore be a flat edge designed to be substantially flush with the edge of the moldboard 200 onto which it is mounted. The left end segment 300 may include similar features as an interior blade such as the deflector strips, a central bolt hole 155 and a right bolt hole 165. The left edge segment 300 includes an overlap section 125 comprising a recessed section for accommodating the extension section of an adjacent interior segment. The overlap section 125 of the left end segment 300 also includes an extension section for overlapping with the adjacent interior segment. The extension section and recessed section may be as described above for example with reference to FIG. 3. An additional bolt hole 310 may be added for further increasing the strength of the connection between the segment 300 and the moldboard 200 and for increasing the strength and/or rigidity of the moldboard 200 in this region.

The right end blade segment 500 includes an overlap section 130 comprising a recessed section for accommodating the extension section of an adjacent interior segment. The overlap section 130 of the right end segment 500 also includes an extension section for overlapping with the adjacent interior segment. The extension section and recessed section may be as described above for example with reference to FIG. 3. An additional bolt hole 510 may be added for further increasing the strength of the connection between the segment 500 and the moldboard 200 and for increasing the strength and/or rigidity of the moldboard 200 in this region.

Figure 8:
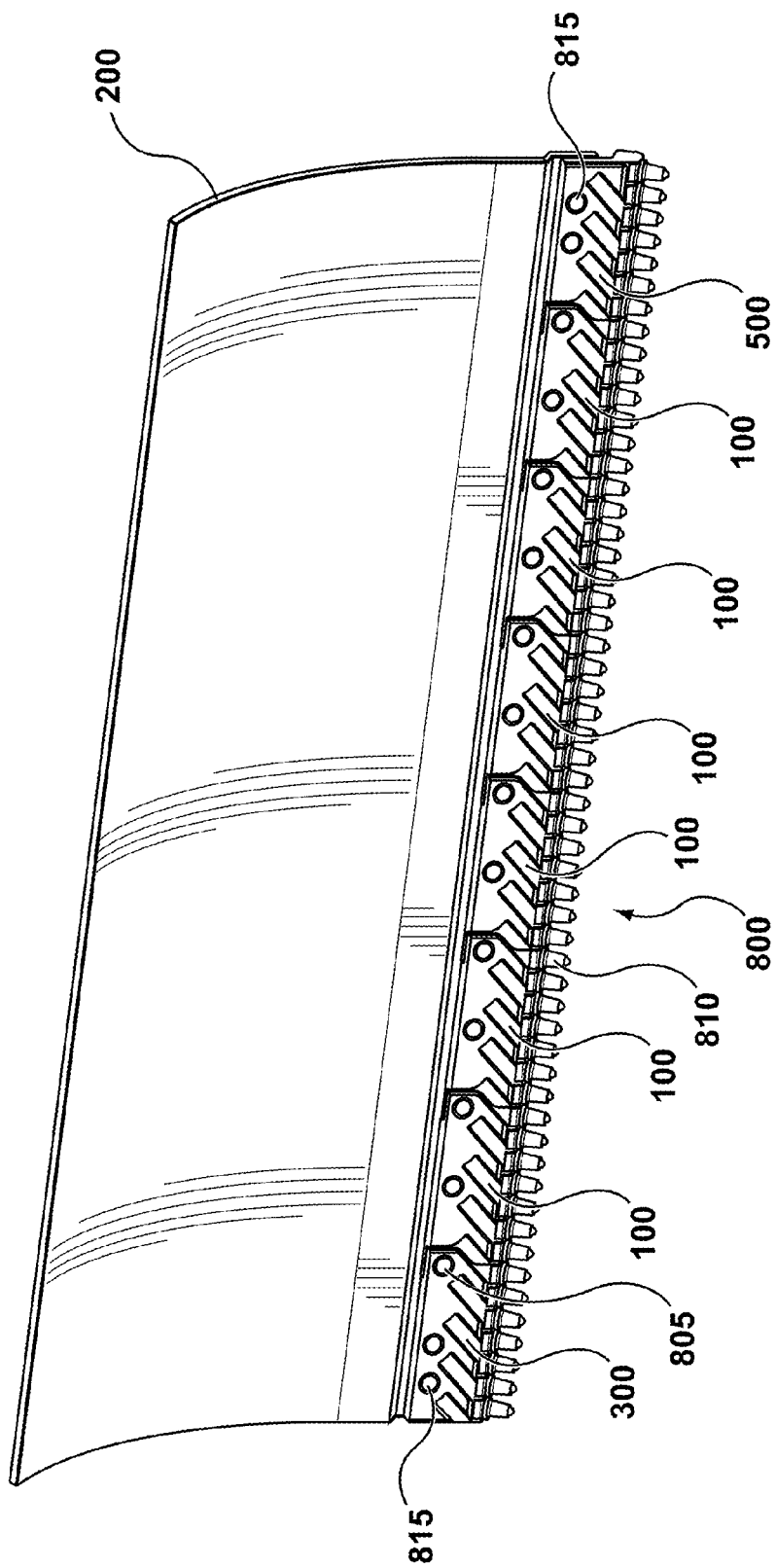
FIG. 8 is a prospective view illustrating an embodiment of a blade assembly including a moldboard with attached overlapping blade segments.

FIG. 8 illustrates an embodiment of a blade assembly 800 for use with a surface working machine. The blade assembly 800 includes a moldboard 200 having a front face 205 oriented in the forward direction of the surface working machine. Onto the lower mounting edge of the moldboard 200 in the lower mounting section (as outlined above for example with reference to FIG. 5), is mounted a segmented blade comprised of a plurality of interior blade segments 100, a left end blade segment 300 and a right end blade segment 500. Each segment has an overlapping join with the segment adjacent thereto. Further, an overlapping bolt 805 detachably connects the segments to the moldboard 200 through the overlap region of adjacent segments. A central bolt 810 detachably connects the segments to the moldboard 200 in a central region of a segment. An end bolt 815 detachably connects the end region of the segments 300 and 500 to the moldboard 200. To detach a segment, all of the connecting bolts must be removed and the segment withdrawn from the blade assembly 800. In this manner a damaged or worn segment may be replaced. The segments may be sized to be manhandled by a single operator. The overlapping joint between adjacent segments of the segmented blade protects the moldboard 200 in the region of the join thereby reducing the rate of erosion or washout of the moldboard 200 in this region. Further, the use of an overlap connecting bolt 805 increases the strength of the moldboard in the region of the join of adjacent segments.

It will be appreciated that while tool carrier segments are shown to illustrate the blade assembly in FIG. 8, other types of segment may be used in an overlapping segmented blade in a blade assembly.

Figure 9:
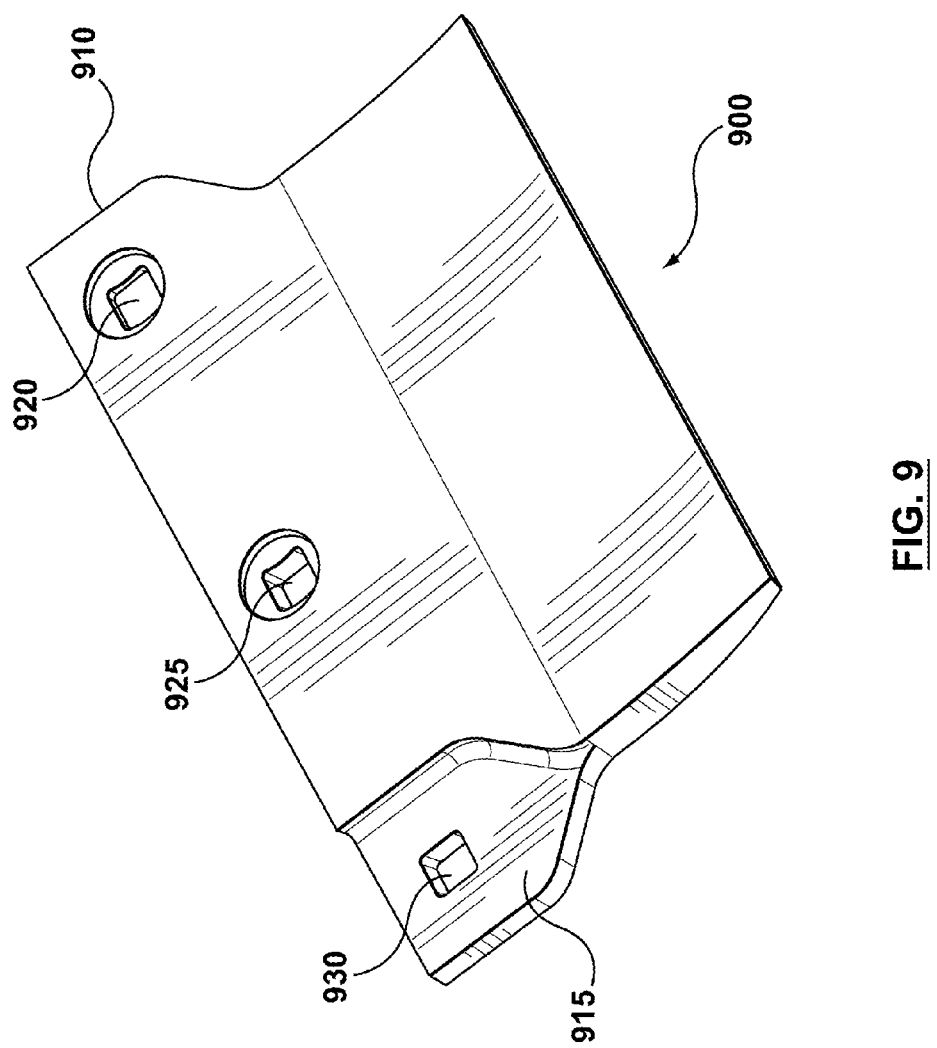
FIG. 9 is a prospective view illustrating an embodiment of a flat scraper blade segment.
Figure 10:
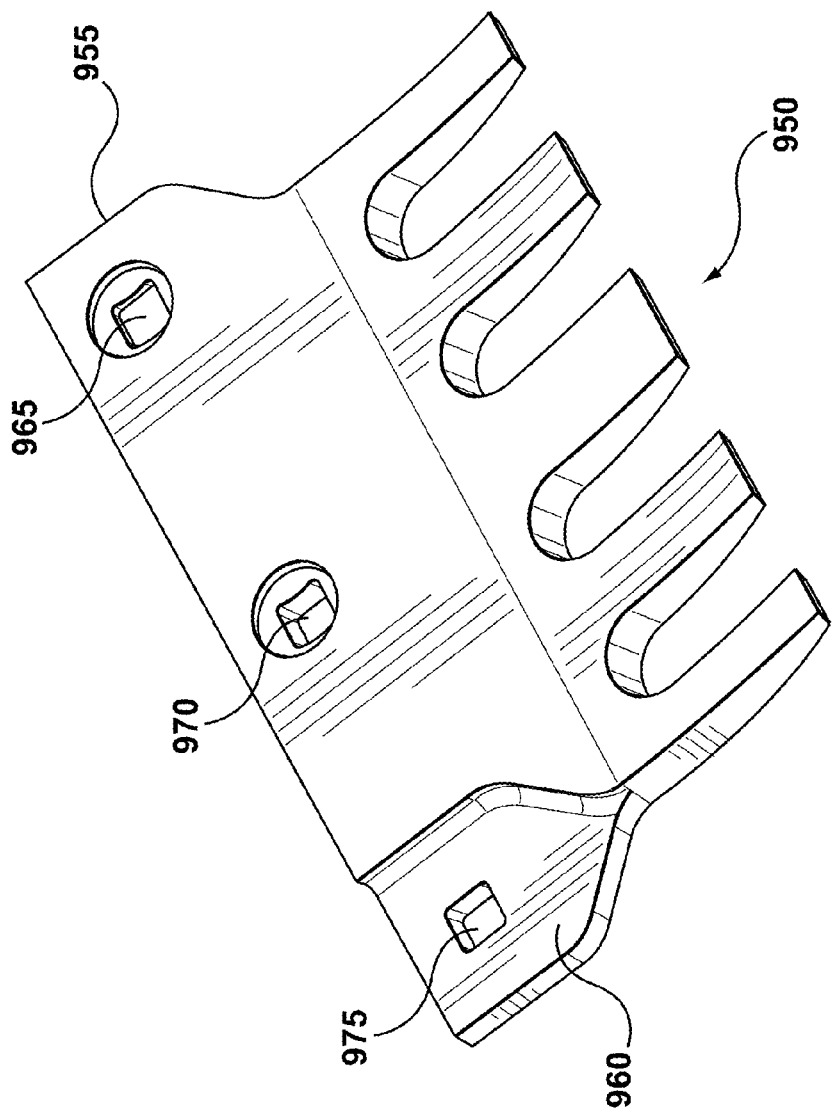
FIG. 10 is a prospective view illustrating an embodiment of a serrated blade segment.
Figure 11:
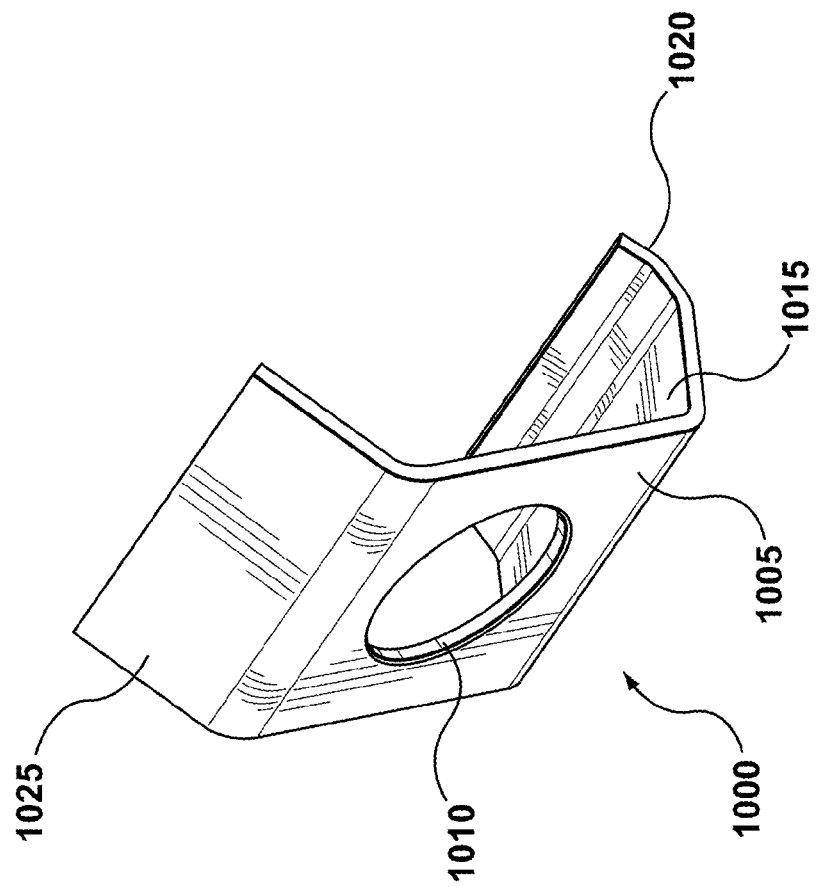
FIG. 11 is a schematic view illustrating one embodiment of a tool shield retainer clip.
Figure 13:
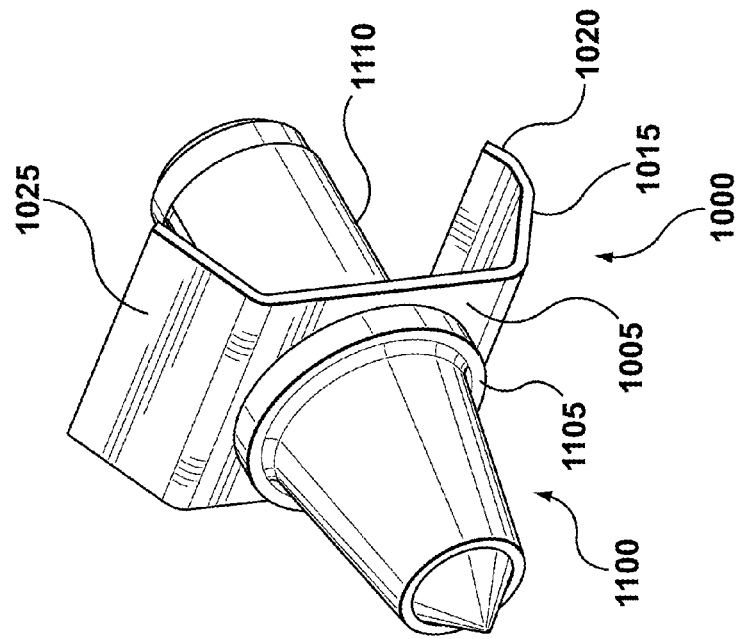
FIG. 13 is a prospective view illustrating one embodiment of a tool shield retainer clip installed on a rotating bit tool
Figure 12:
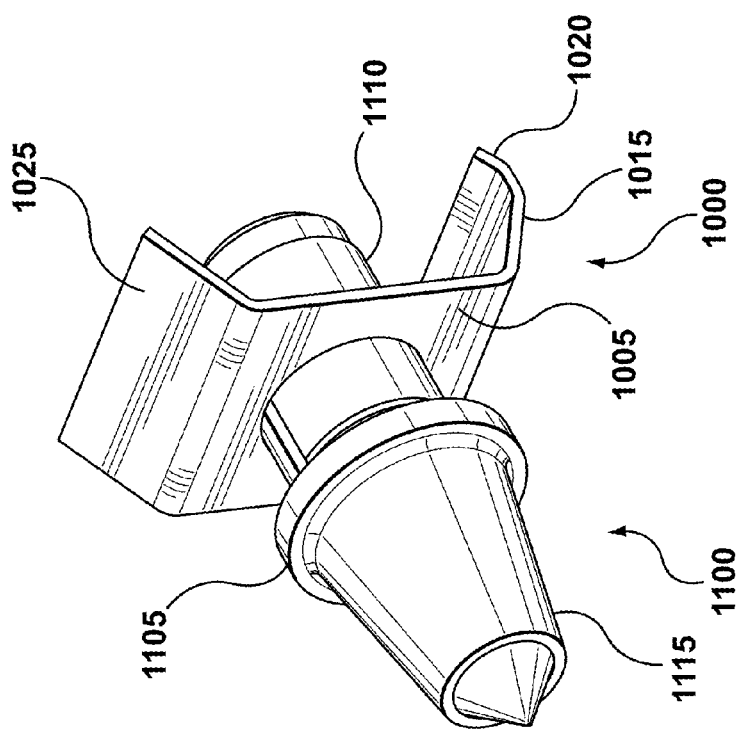
FIG. 12 is a prospective view illustrating one embodiment of a tool shield retainer clip partially installed on a rotating bit tool.

Examples of other types of blade segment are shown in FIGS. 9 and 10. FIG. 9 shows an illustrative embodiment of a flat scraper blade segment 900 for use as an interior blade segment. Similarly to interior blade segments described herein, the interior flat scraper blade segment 900 comprises a first overlap section 910 and a second overlap section 915 for overlapping with an adjacent flat scraper blade segment. The flat scraper blade segment 900 also includes a central bolt hole 925, right bolt hole 920 and a left bolt hole 930 for detachably connecting the segment 900 to a moldboard 200.

Shown in FIG. 10 is a serrated blade segment 950 for use as an interior blade segment. Similarly to interior blade segments described herein, the interior serrated blade segment 950 comprises a first overlap section 955 and a second overlap section 960 for overlapping with an adjacent serrated blade segment. The serrated blade segment 950 also includes a central bolt hole 970, right bolt hole 965 and a left bolt hole 975 for detachably connecting the segment 950 to a moldboard 200.

EXAMPLE

In one example of an interior tool carrier blade segment of a size suitable to be manhandled, the blade segment had a weight of approximately 40 lbs depending on the detachable tool used. The segment had an overall length including the overlap sections on each side of approximately 14.5 in and a length from left edge to right edge of approximately 12 in. As such, the extension section on each side of the segment extends beyond the left or right edge approximately 1¼ in. Correspondingly, the recessed sections protruded inwards from the edges approximately 1¼ in to accommodate the extension section from an adjacent segment.

It will be appreciated that the segments may differ in size to that segment described above. Further, it is not essential that a segment be of a size suitable to be manhandled by a single operator, it is merely one embodiment of the segments disclosed herein.

Experimental Data

To further confirm indications of increased strength of the segmented blade system relative the previous blade system comprised of non-overlapping segments which abut at the joint between adjacent segments, 3D modelling were to carry out a stress analysis of the old assembly and the new assembly. The results of which are shown below.

Figure 16:
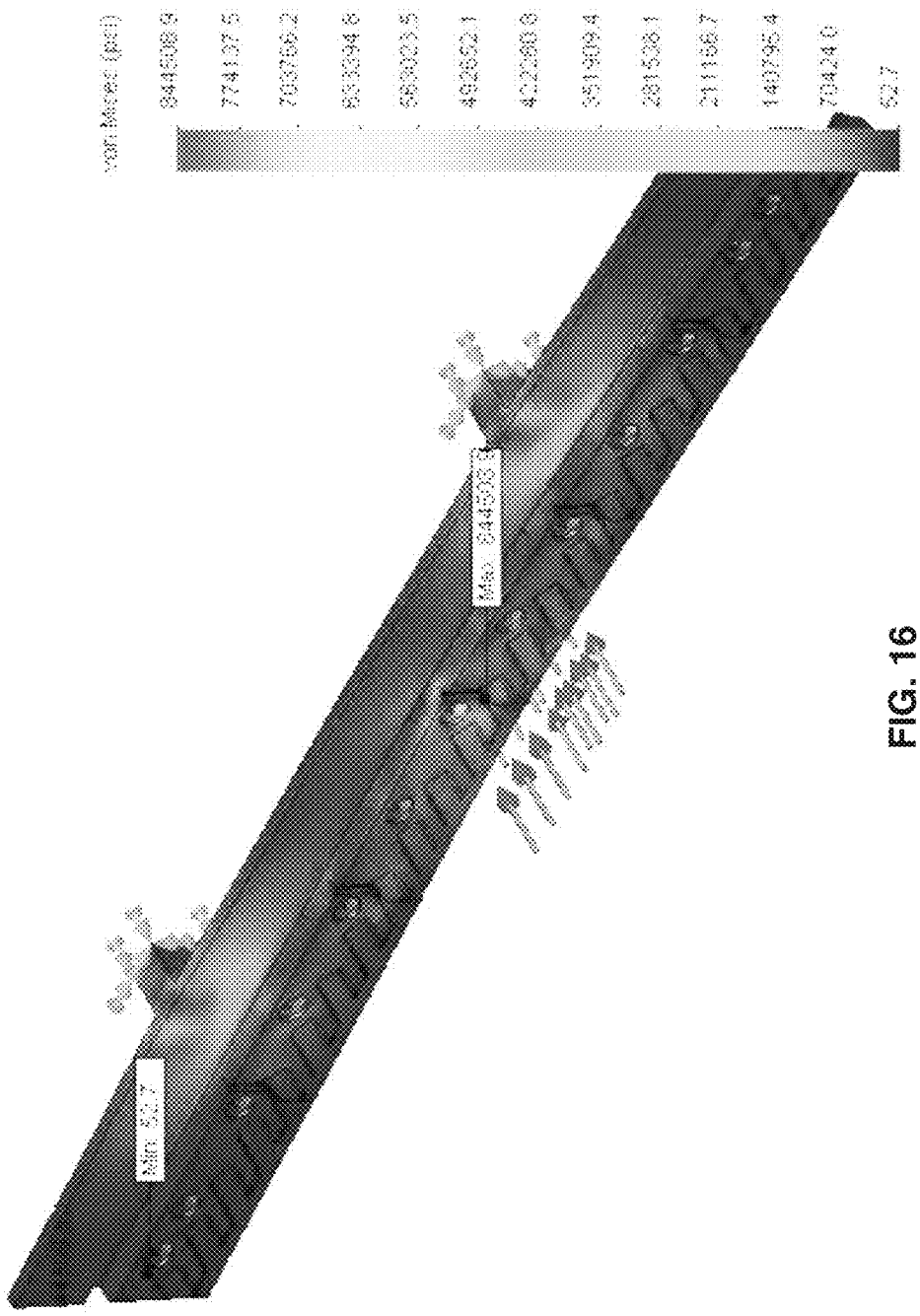
FIG. 16 is a 3D graph representative of modelling of stress of an overlapping segmented blade assembly.
Figure 17:
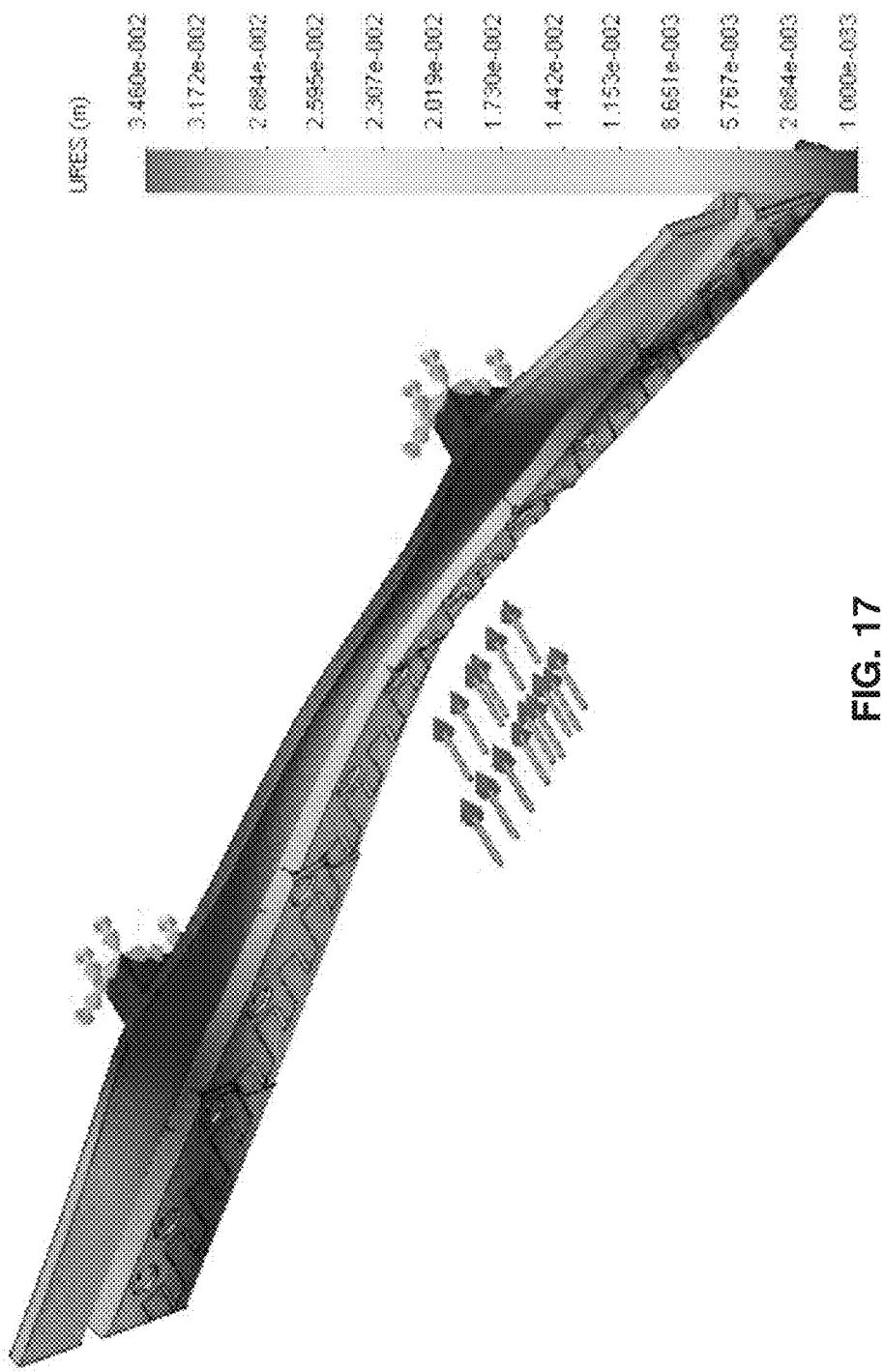
FIG. 17 is a 3D graph representative of modelling of displacement of an overlapping segmented blade assembly.
Figure 18:
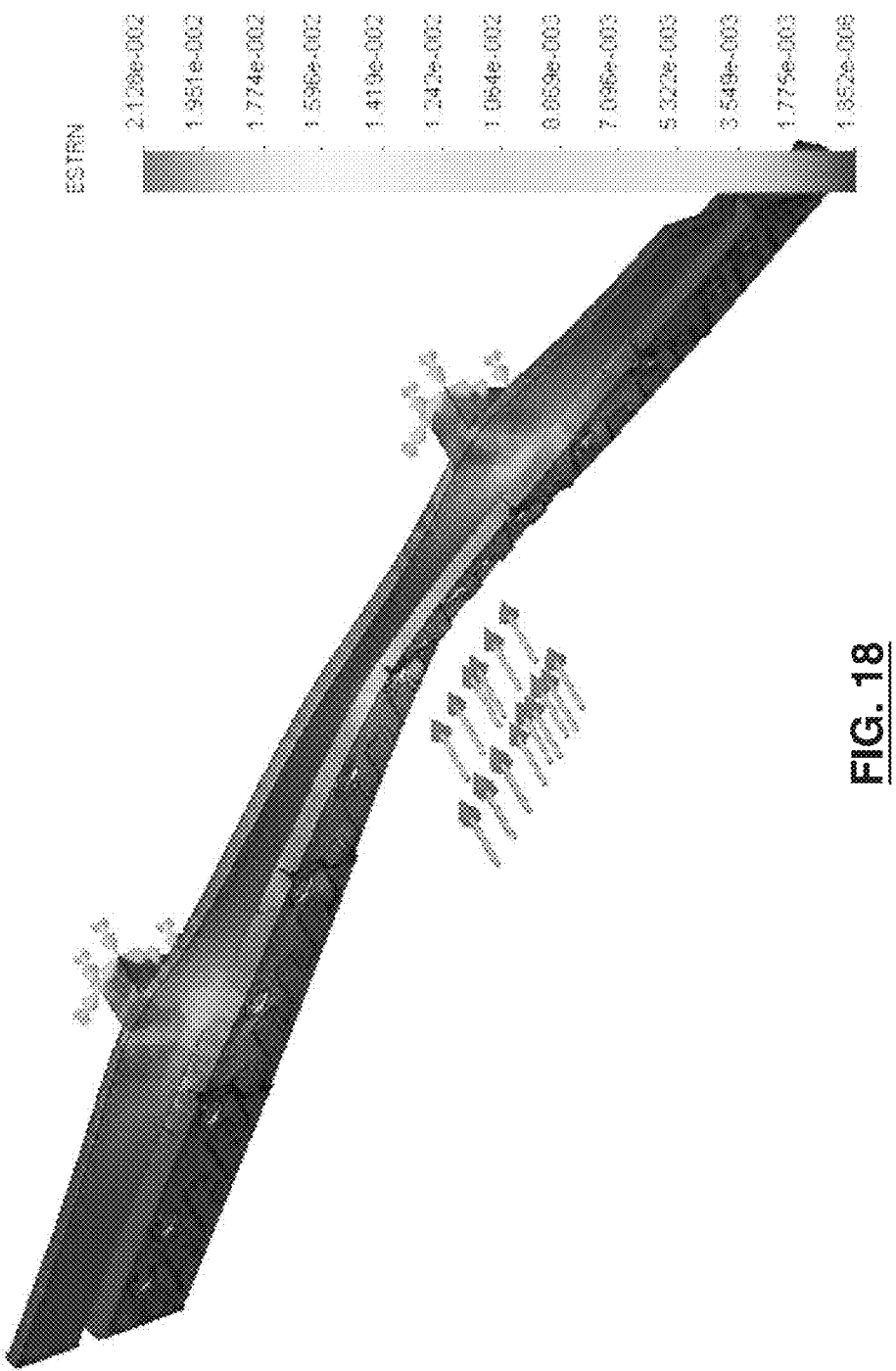
FIG. 18 is a 3D graph representative of modelling of strain of an overlapping segmented blade assembly.
Figure 19:
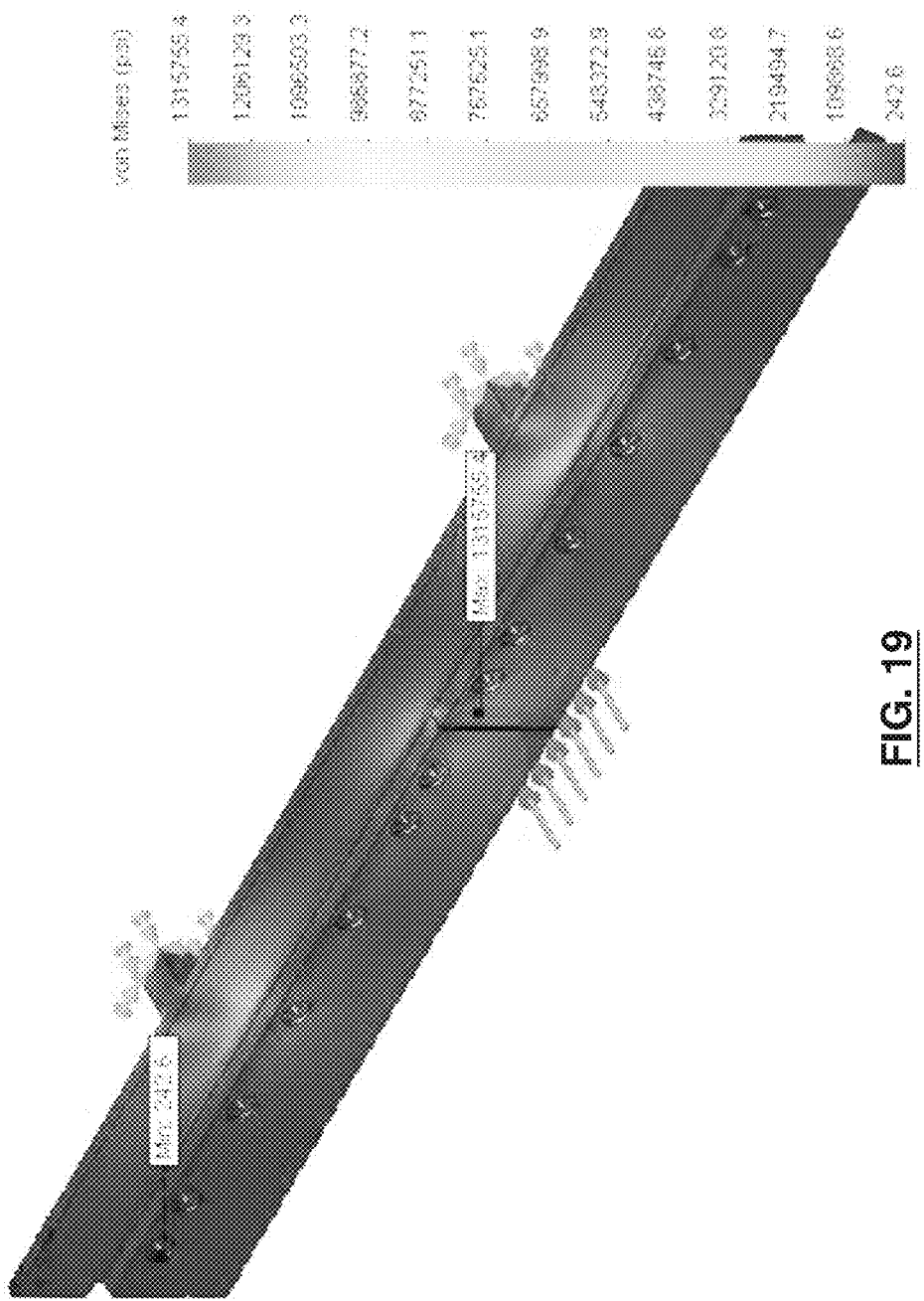
FIG. 19 is a 3D graph representative of modelling of stress of a non-overlapping prior art blade assembly having butt-joint segments.
Figure 21:
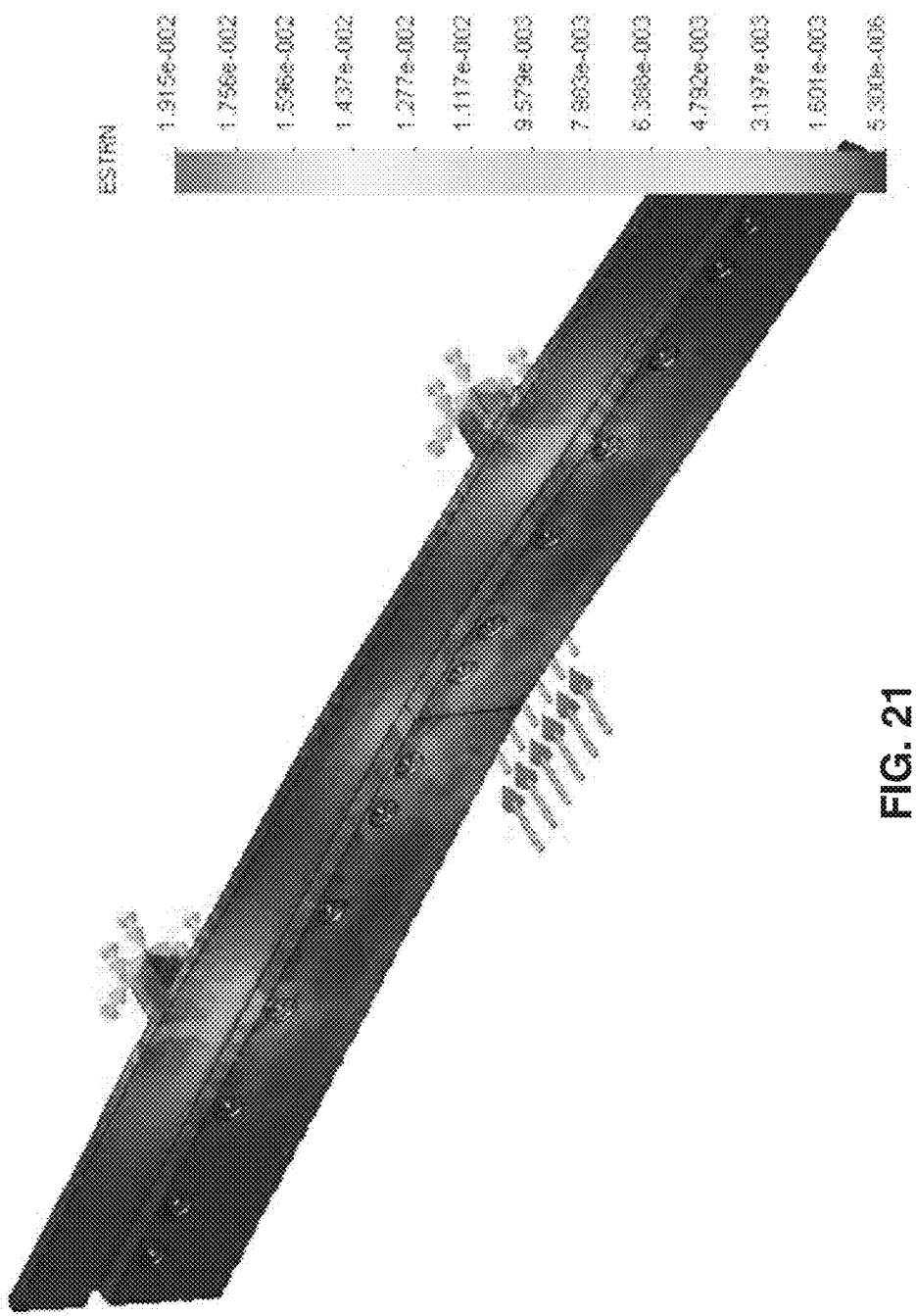
FIG. 21 is a 3D graph representative of modelling of strain of a non-overlapping prior art blade assembly having butt-joint segments.
Figure 22:
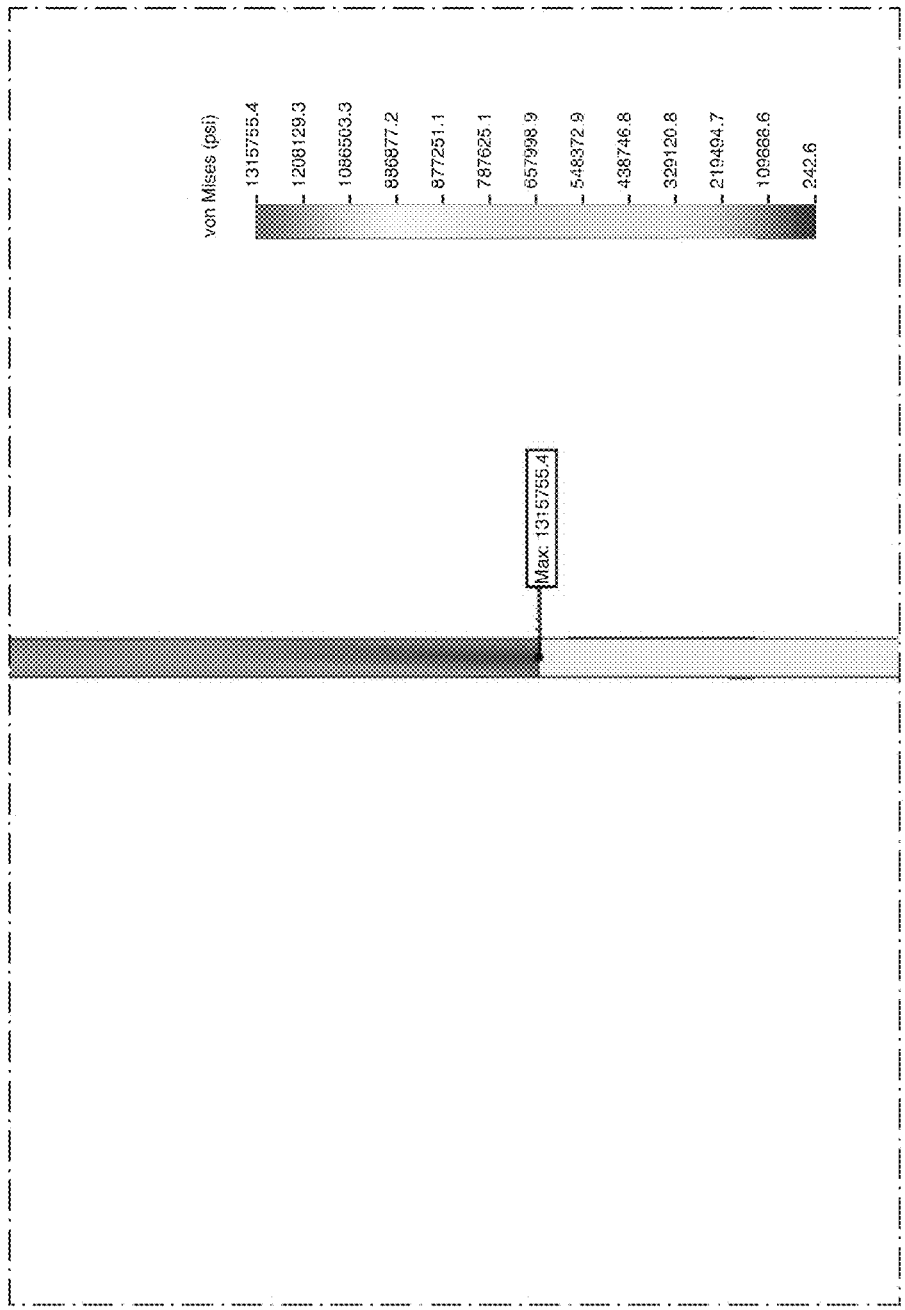
FIG. 22 is a cross sectional graph representative of modelling of the maximum stress location of a non-overlapping prior art blade assembly having butt-joint segments.

The 3D modelling test results are shown in FIGS. 16 to 22, wherein the analysis of the new overlapping blade assembly is shown in FIGS. 16 to 18 and the analysis of the old blade assembly is shown in FIGS. 19 to 22.

In summary, it was identified that the maximum stress was higher in the old assembly than in the new overlapping blade assembly. Stress was reduced in the joint area by more than 35%. Further the location of the stress was moved from the moldboard to the overlapping segments. This explains the stress reduction. The overlapping join reinforces the moldboard by creating a sandwich of plates fastened with the connecting bolt through the overlapping section of adjacent segments.

In addition, it was determined that the old style blade assembly could not be fastened through the last bolt hole adjacent to the joint. This left 12 in. distance between bolt supports.

The improvement with respect to washout of the moldboard is visible in the Figures of the old assembly joint gap and the new overlapping board joint gap.

For both the old and new blade assemblies, the modelling was carried out using the following restraint and loading parameters. The restraints for the assemblies were applied on two bosses attached to the back of the moldboard base. The load in the form of a force was applied at the bottom edge of six holes. The tool holes were located adjacent to the overlapping joint at the middle of the moldboard. At each location 10,000 lbs of force was applies for a total of 60,000 lbs.

The 3D modelling analysis of the old blade assembly was carried out using 3 foot blade segments with the model of a moldboard base. This assembly simulates actual working conditions of the boards and is illustrated in FIGS. 19 to 22. Conclusion of the test indicates that due to the nature of the butt joint the moldboard was supporting the complete load. The results show that the maximum stress was located between the segments in the moldboard below the bolting hole. The central bolting hole which was located in the middle of the joint was not utilized due to the standard old blade assembly configuration. The standard old blade segments in any combination could be bolted only through the second hole from the end. This configuration left 12 inches of space between the bolts surrounding the joint.

The 3D modelling analysis of the new overlapping blade assembly was carried out using four central 12 inch overlapping segments with one left end 12 inch segment and one right end 12 inch segment on a six foot moldboard. The overlapping segmented blades were assembled with the model of a moldboard base. This assembly simulates actual working conditions of the boards.

The overlapping joint design protects the moldboard bay absorbing the applied load. This study shows the maximum stress was located in the wings of the overlapping joint. The overlapping joint design utilizes all the available holes on the standard moldboard to improve fastening. Maximum stress was also reduced. The maximum stress value was found to be 844,508.9 psi under the same restrain and loading condition as applied on the old blade assembly. Comparing the old blade assembly to the new overlapping blade assembly, maximum stress was reduced more than 35%.

Tool Shield Retainer Clip

A tool shield retainer clip is shown generally at 1000 in FIGS. 11 to 15. The clip 1000 is designed to help retain a detachable tool 1100 and reduce the wear on the tool carrier caused by erosion or washout. The clip 1000 may also be used to reinforce the connection of a detachable tool 1100, including a spring held tool. The clip 1000 is installed on the tool 1100 and can remain part of the tool assembly. The clip 1000 is comprised of a front section 1005 which may be characterized as a flat section having an aperture 1010 therein for receiving a shank 1110 of the tool 1100. The aperture 1010 may further be of adequate size to compress the tools spring clip retainer (not shown) to the size of the tool attachment hole 150 thereby facilitating installation of the tool 1100 in the tool attachment hole 150 in the bottom 120 of a blade 100.

The front section 1005 sits under the tool flange 1105 once the tool 1100 has been inserted into the aperture 1010. The front section 1005 protects at least a portion of the front face 105 of a tool carrier blade 100 and at least somewhat reduces erosion and/or washout of the front face 105 in the region around a tool 1100.

A back shield section 1015 is situated adjacent the front section 1005 and may have an angle relative the front section 1005 such that the back section 1015 follows the shape of the bottom 120 of a tool carrier blade 100. This feature is better illustrated in FIGS. 14 and 15. The back section 1015 shields a portion of the bottom section of the blade 100 in a region around the tool 1100.

The clip 1000 includes a tail flange 1020 connected to the back section 1015 opposite the front section 1005. The tail flange 1020 is shaped to engage the longitudinal ridge 170 when the tool 1100 is fully inserted into the tool attachment hole 150. Engagement of the tail flange 1020 with the longitudinal ridge 170 on the blade 100 increases the strength of the connection of the tool 1100 with the blade 100 thereby reducing the likelihood of dislodging of the tool 1100 from the blade 100 and loss of tools 1100. The tail flange 1020 should therefore be positioned a proper distance from the front section 1005 via the back section 1015 such that on full installment of the tool 1100 into the tool attachment hole 150, the tail flange 1020 engages the ridge 170 thereby substantially locking the tool in place.

The clip 1000 may further include a top section 1025 for further protecting the front face 105 of the blade 100. The top section 1025 is adjacent the front section 1005 and opposite the back section 1015.

The present invention has been described with regard to a plurality of illustrative embodiments. However, it will be apparent to persons skilled in the art that a number of variations and modifications can be made without departing from the scope of the invention as defined in the claims.

We claim:

1. A system comprising:
  a tool carrier blade comprising a back face and a bottom edge, the back face including a longitudinal ridge and the bottom edge including a tool receiving hole for receiving a removable tool; and
  a tool shield retainer clip for securing the removable tool to the tool carrier blade, the tool shield retainer clip comprising:
    a front section including an aperture for receiving a connection end of the tool;
    a back section adjacent the front section, the back section and the front section connected at an angle substantially equal to the angle between the bottom edge and the back face of the blade, the back section having a length substantially equal to the distance between the longitudinal ridge and the bottom edge;
    a tail flange connected to the back section opposite the front section, the tail flange shaped to engage the longitudinal ridge when the tool is fully inserted into the tool receiving hole; and
    a top section adjacent the front section and opposite the back section, the top section connected to the front section at an angle suitable to provide the top section in an orientation substantial parallel to a front face of the blade.

2. The system of claim 1, wherein the aperture is centrally positioned in the front section.

3. The system of claim 1, wherein the aperture is of diameter adequate to compress a tools spring clip retainer to the diameter of a tool receiving hole in a bottom edge of a blade.

\* \* \* \* \*